United States Patent
Killion et al.

(10) Patent No.: US 12,539,391 B2
(45) Date of Patent: Feb. 3, 2026

(54) CATHETERS HAVING VISIBLE MARKERS FOR IDENTIFYING SOAKER REGIONS CONTAINING FLUID OPENINGS

(71) Applicant: Ethicon, Inc., Raritan, NJ (US)

(72) Inventors: John A. Killion, Flemington, NJ (US); Frank Richard Cichocki, Jr., Easton, PA (US); Gaoyuan Chen, Hillsborough, NJ (US)

(73) Assignee: Ethicon Inc., Raritan, NJ (US)

( * ) Notice: Subject to any disclaimer, the term of this patent is extended or adjusted under 35 U.S.C. 154(b) by 627 days.

(21) Appl. No.: 17/814,556

(22) Filed: Jul. 25, 2022

(65) Prior Publication Data

US 2023/0031355 A1    Feb. 2, 2023

Related U.S. Application Data

(60) Provisional application No. 63/226,384, filed on Jul. 28, 2021.

(51) Int. Cl.
*A61M 25/00* (2006.01)
*B29C 63/00* (2006.01)
(Continued)

(52) U.S. Cl.
CPC ...... *A61M 25/007* (2013.01); *A61M 25/0015* (2013.01); *B29C 63/0069* (2013.01);
(Continued)

(58) Field of Classification Search
CPC ........ A61M 25/007; A61M 2025/0008; A61M 25/0009; A61M 25/0012; B29L 2031/7542
See application file for complete search history.

(56) References Cited

U.S. PATENT DOCUMENTS 3,605,750 A    9/1971   Sheridan et al.
5,045,071 A *  9/1991   McCormick ...... A61M 25/0009
                                              128/207.14
(Continued)

FOREIGN PATENT DOCUMENTS

WO    WO-2009117270 A2 *  9/2009   ........ A61M 25/0009
WO    2021/0084462         5/2021

OTHER PUBLICATIONS

International Search Report and Written Opinion, received for PCT Application No. PCT/IB2022/056835, mailed on Jan. 27, 2023, 19 pages.
(Continued)

*Primary Examiner* — Carson Gross
(74) *Attorney, Agent, or Firm* — Amir Bishara

(57) ABSTRACT

A catheter for delivering fluids includes a hollow tube having a proximal section, a distal section, and an elongated lumen that extends through the proximal and distal sections of the hollow tube. One or more fluid openings are formed in the distal section of the hollow tube, which are in fluid communication with the elongated lumen of the hollow tube. A visible marker collar is secured to an outer surface of the hollow tube and is located at a junction of the proximal and distal sections of the hollow tube. A visible marker filament is disposed within the elongated lumen of the hollow tube and extends between the junction of the proximal and distal sections of the hollow tube and a distal end of the hollow tube. The visible markers are used to identify a soaker region of the catheter used to infuse fluids or drain fluids from a patient.

20 Claims, 23 Drawing Sheets

(51) Int. Cl.
  *B29C 63/18* (2006.01)
  *B29L 31/00* (2006.01)
(52) U.S. Cl.
  CPC ..... *B29C 63/18* (2013.01); *A61M 2025/0008* (2013.01); *A61M 25/0009* (2013.01); *A61M 2025/0095* (2013.01); *A61M 2205/584* (2013.01); *B29K 2995/002* (2013.01); *B29K 2995/0026* (2013.01); *B29K 2995/0029* (2013.01); *B29K 2995/0056* (2013.01); *B29L 2031/7542* (2013.01)

(56) References Cited

U.S. PATENT DOCUMENTS

| | | | | |
|---|---|---|---|---|
| 5,951,494 | A | * | 9/1999 | Wang .................... A61M 25/09 600/585 |
| 6,210,396 | B1 | | 4/2001 | Macdonald et al. |
| 2006/0201601 | A1 | | 9/2006 | Furst et al. |
| 2009/0326560 | A1 | * | 12/2009 | Lampropoulos .. A61M 25/0108 604/529 |
| 2011/0106056 | A1 | | 5/2011 | Hatano et al. |
| 2012/0142995 | A1 | | 6/2012 | Tao et al. |
| 2017/0251977 | A1 | | 9/2017 | Fang |
| 2018/0008122 | A1 | * | 1/2018 | Arai .................... A61B 1/00013 |
| 2020/0197664 | A1 | | 6/2020 | Tal |
| 2021/0077776 | A1 | | 3/2021 | Cichocki et al. |
| 2022/0088348 | A1 | * | 3/2022 | Bassett ............. A61M 25/0105 |

OTHER PUBLICATIONS

International Search Report and Written Opinion, received for PCT Application No. PCT/IB2022/056837, mailed on Nov. 16, 2022, 19 pages.
Invitation to Pay Additional Fees, received for PCT Application No. PCT/IB2022/056835, mailed on Nov. 14, 2022, 13 pages.

* cited by examiner

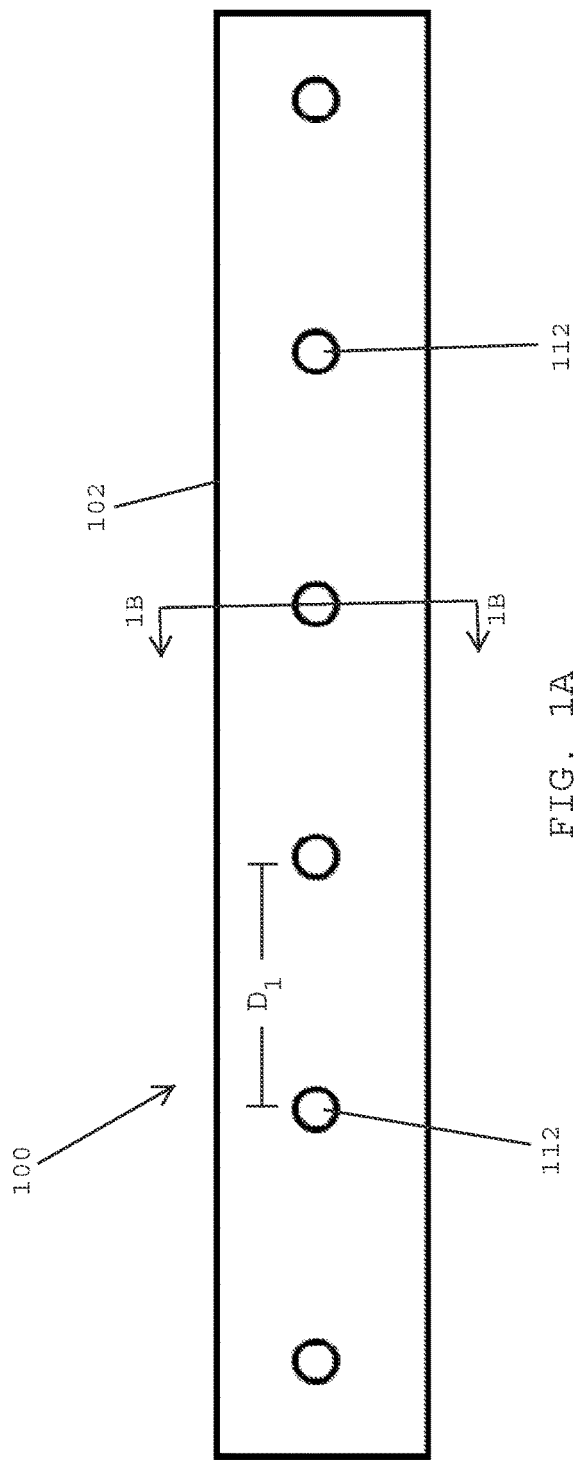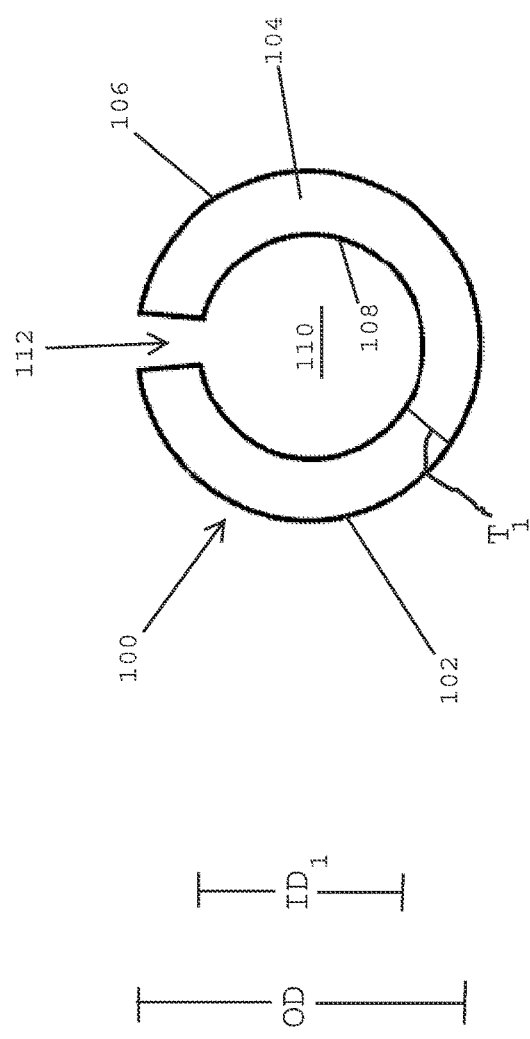

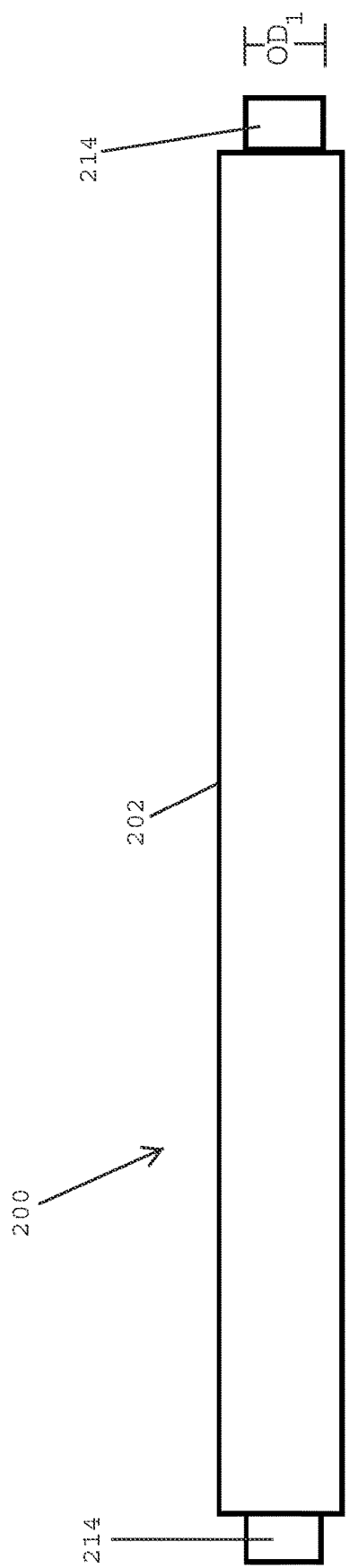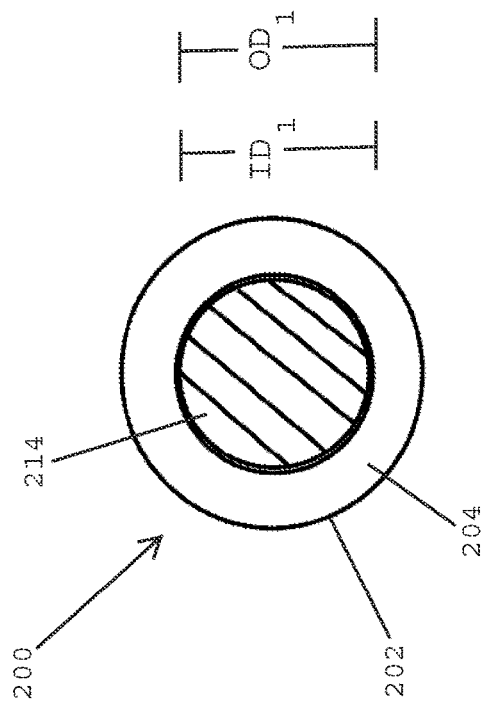
FIG. 3A
FIG. 3B

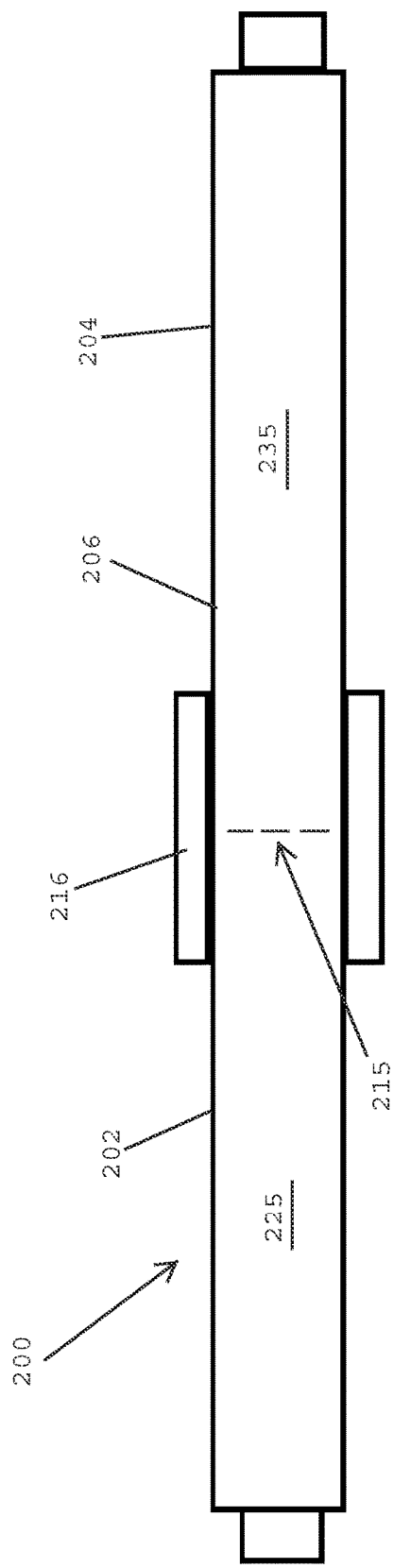
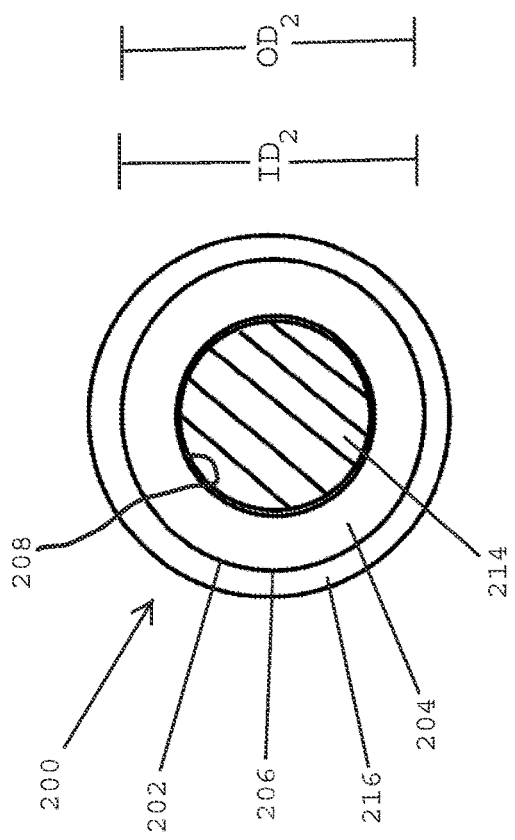
FIG. 4A
FIG. 4B

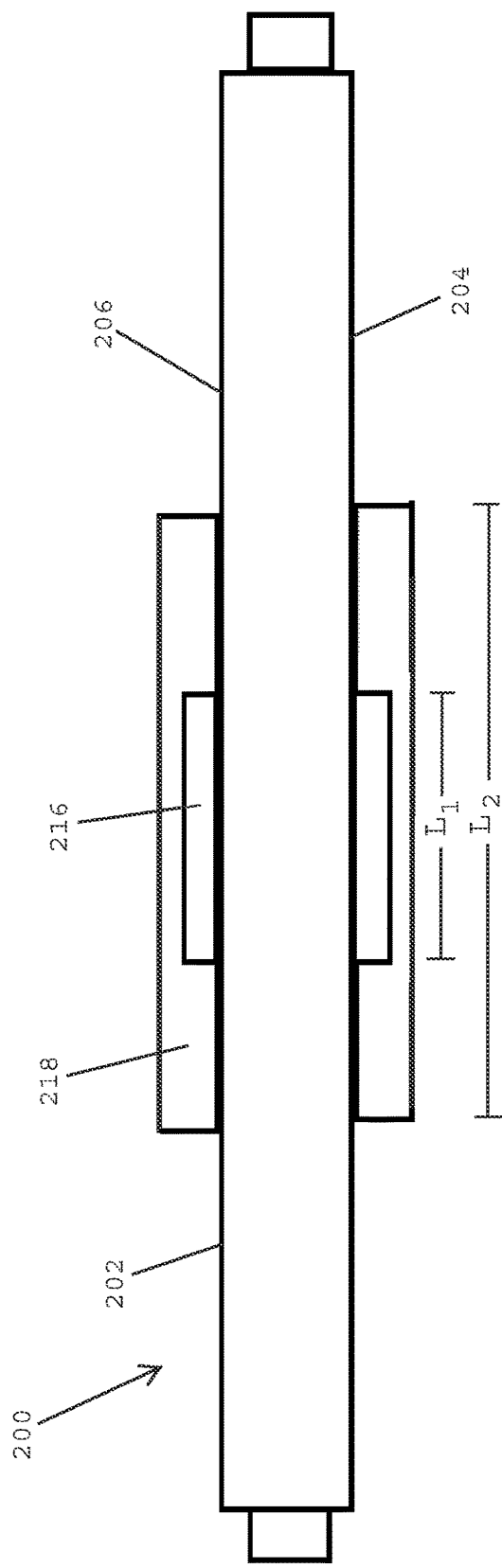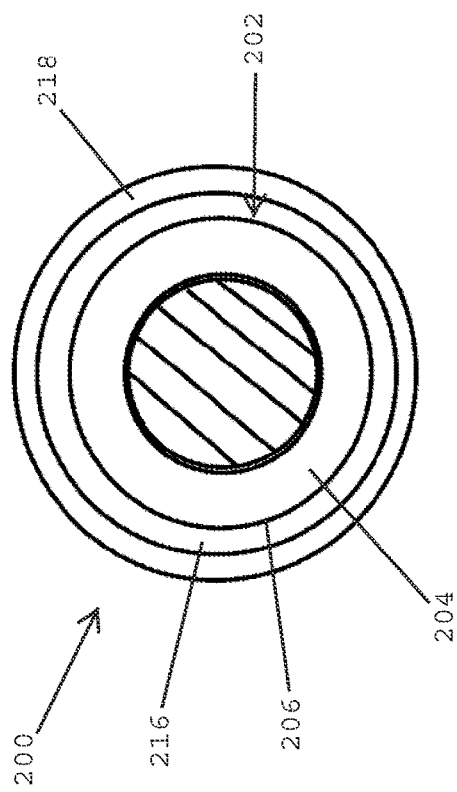
FIG. 5A
FIG. 5B

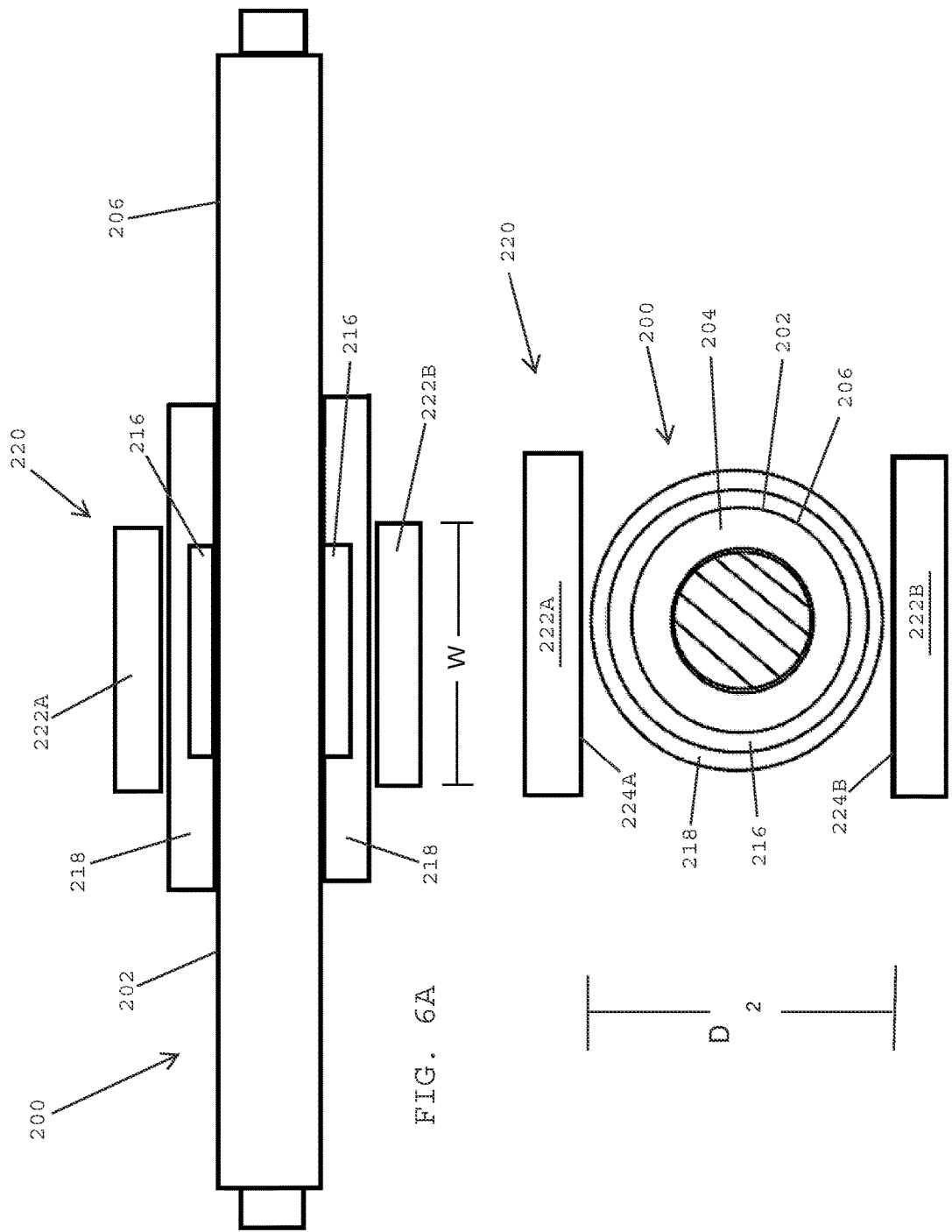

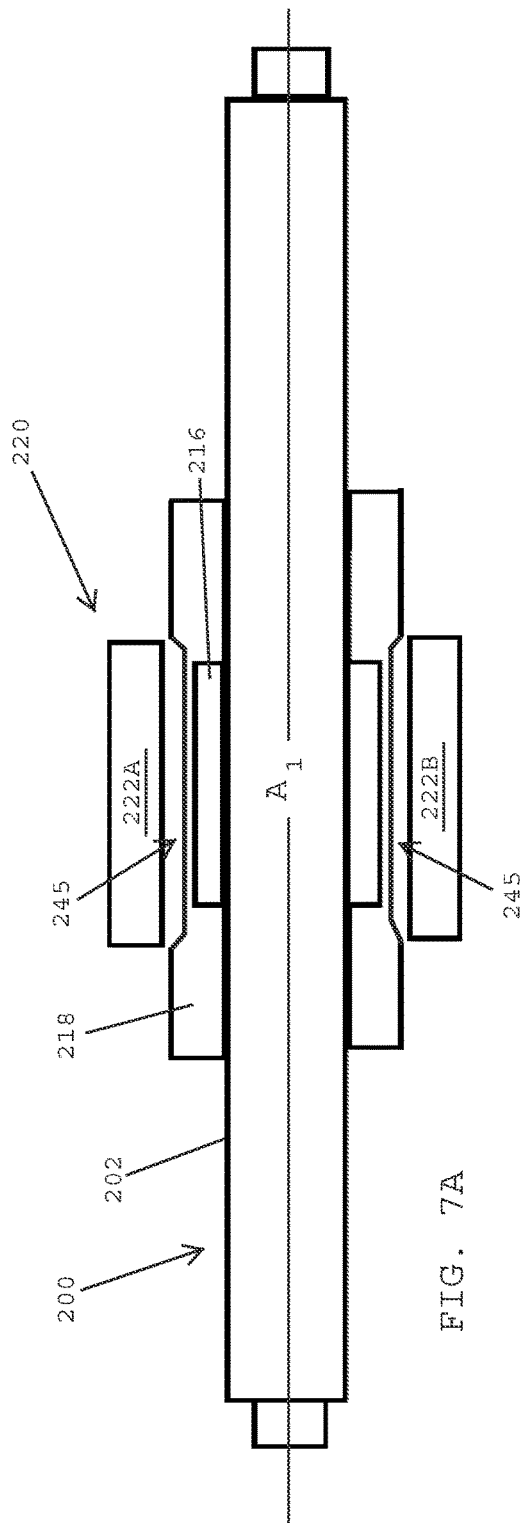
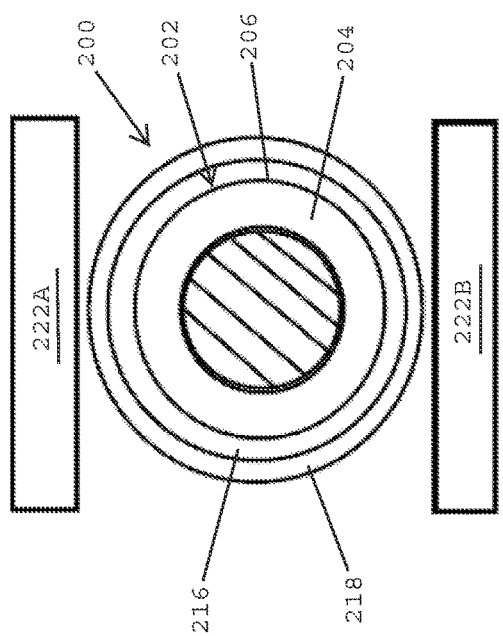
FIG. 7A
FIG. 7B

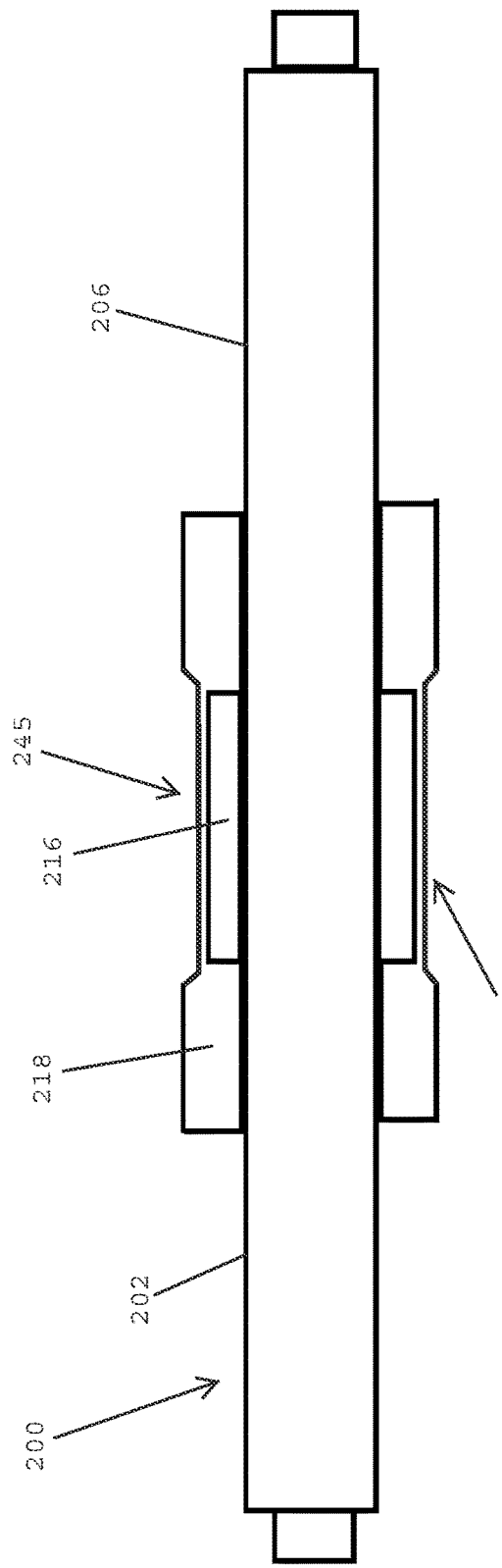
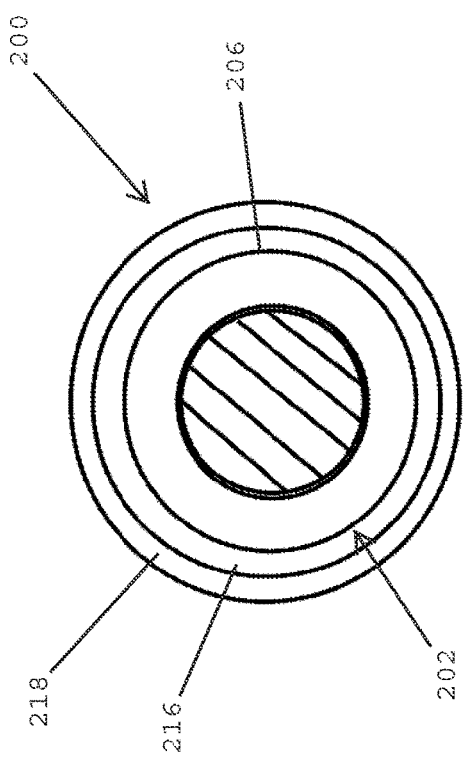
FIG. 8A
FIG. 8B

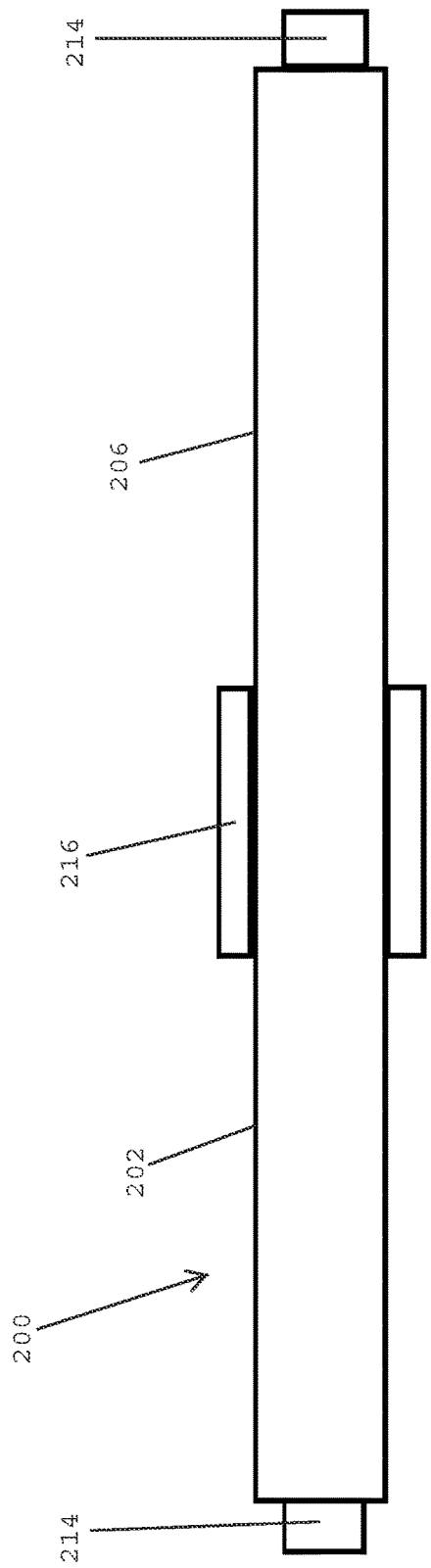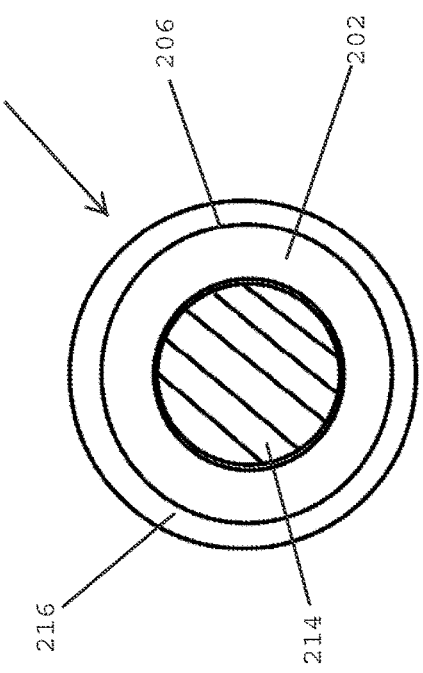
FIG. 9A
FIG. 9B

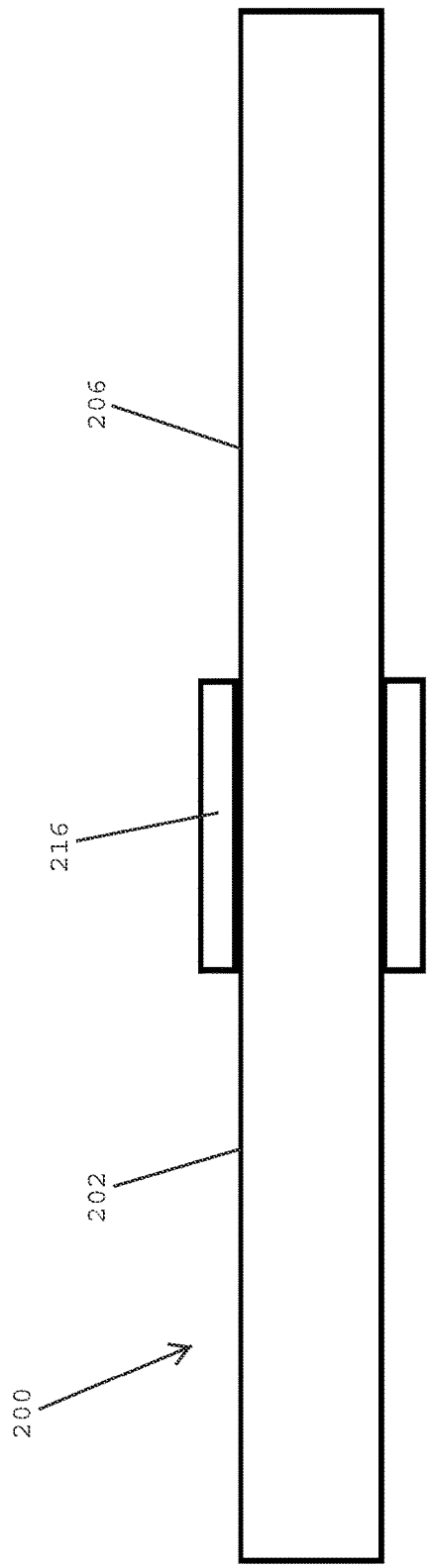
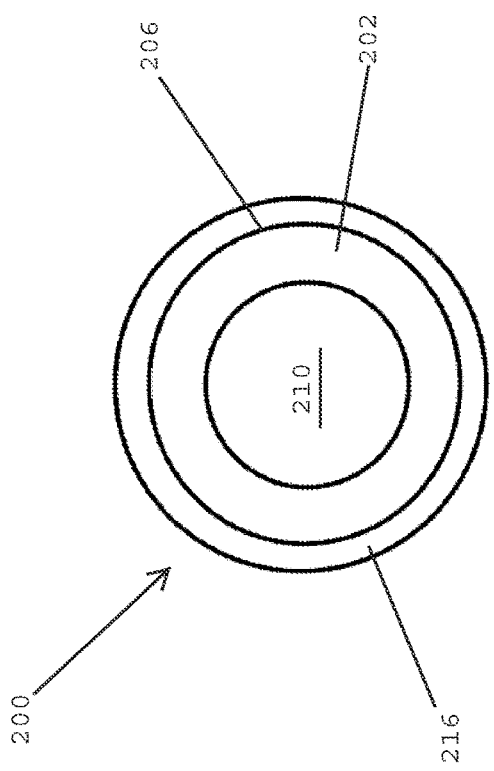
FIG. 10A
FIG. 10B

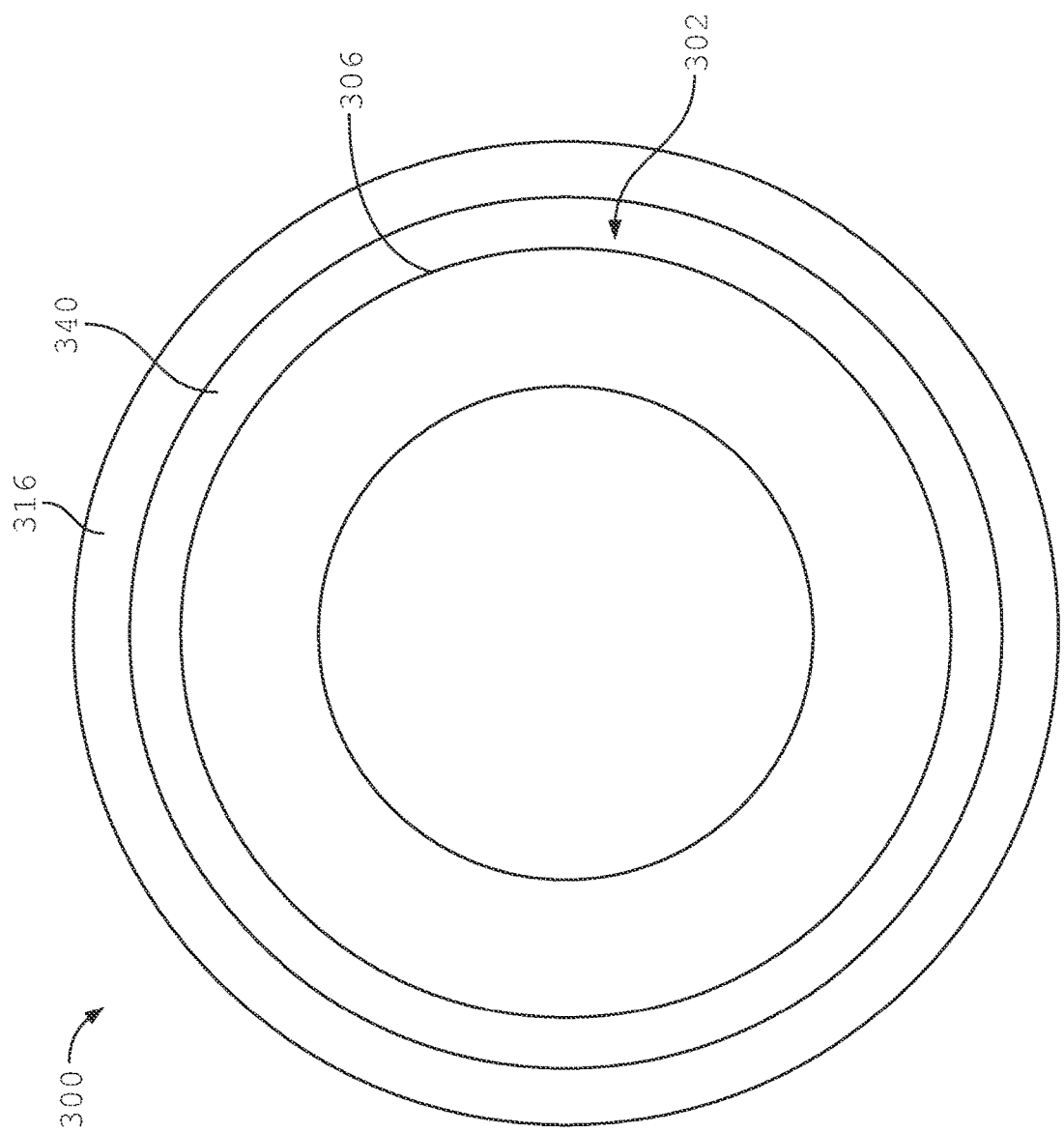

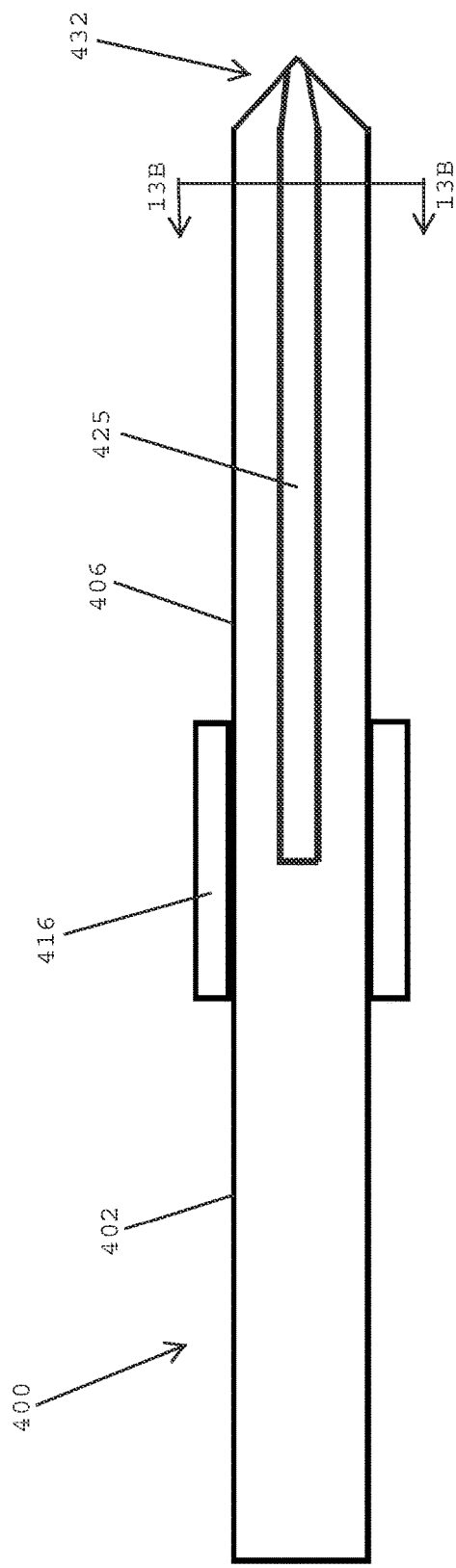
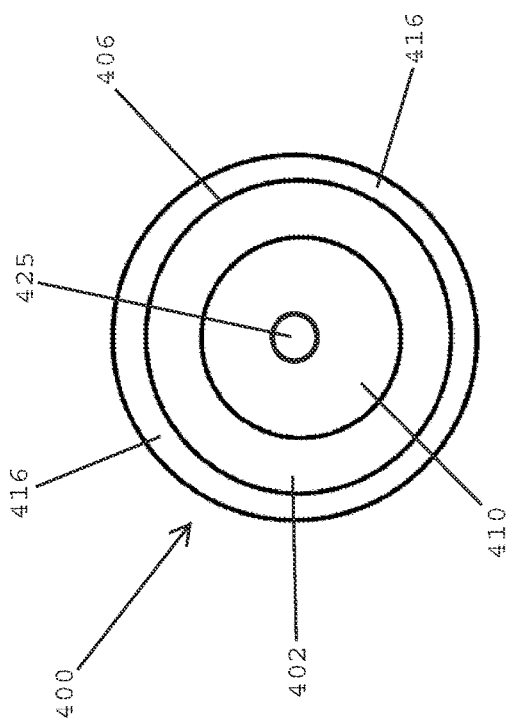
FIG. 13A
FIG. 13B

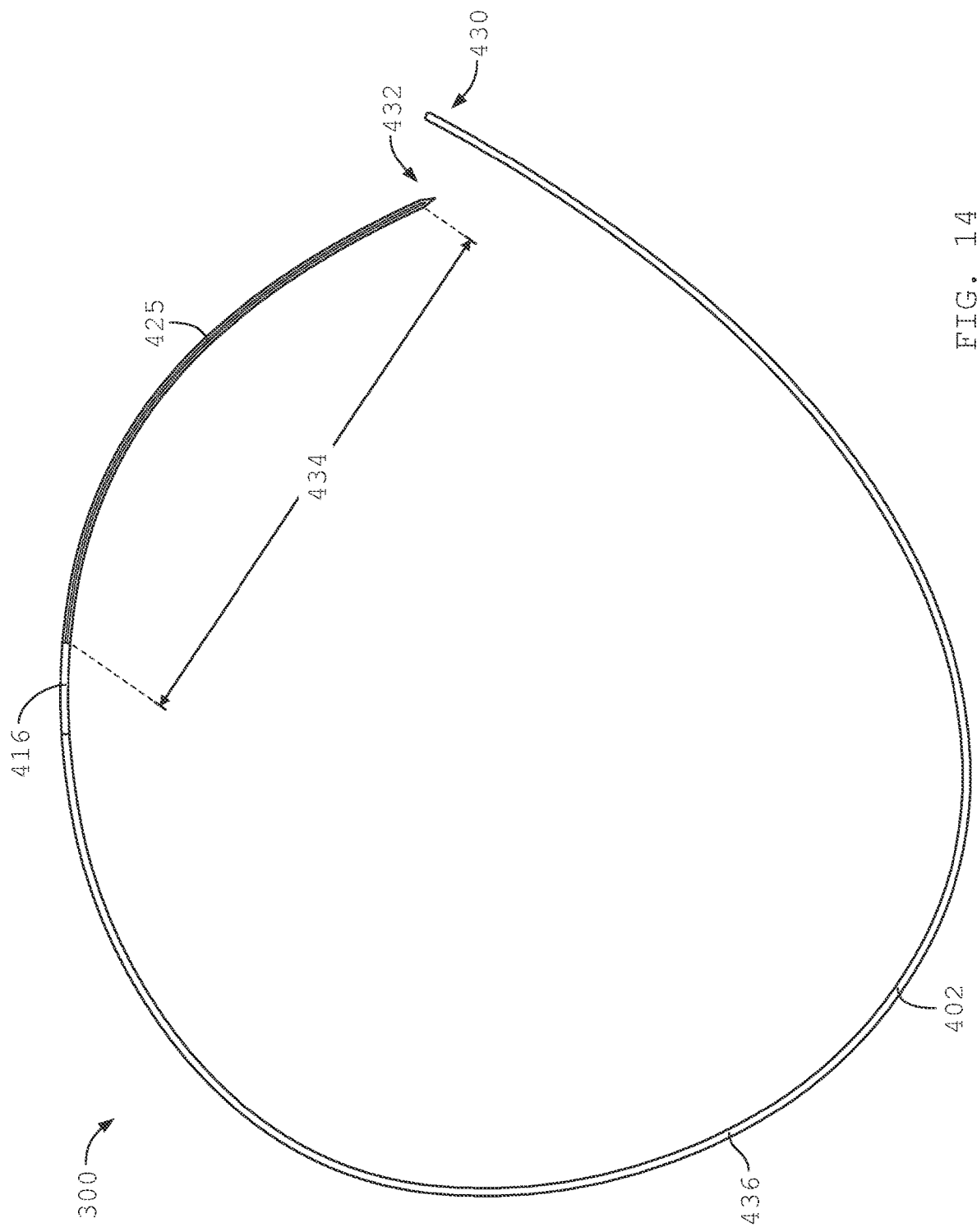

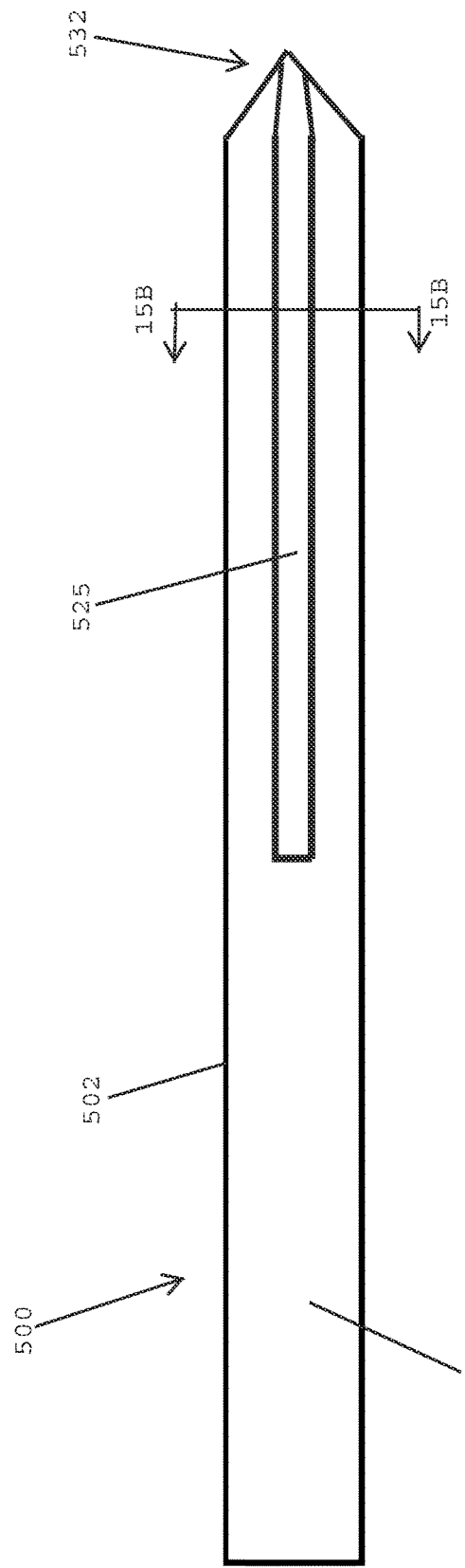
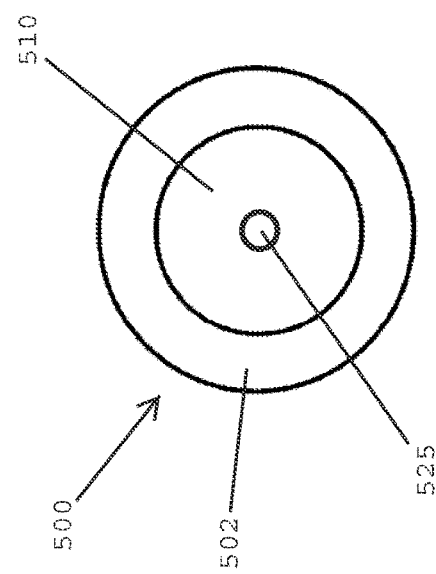
FIG. 15A
FIG. 15B

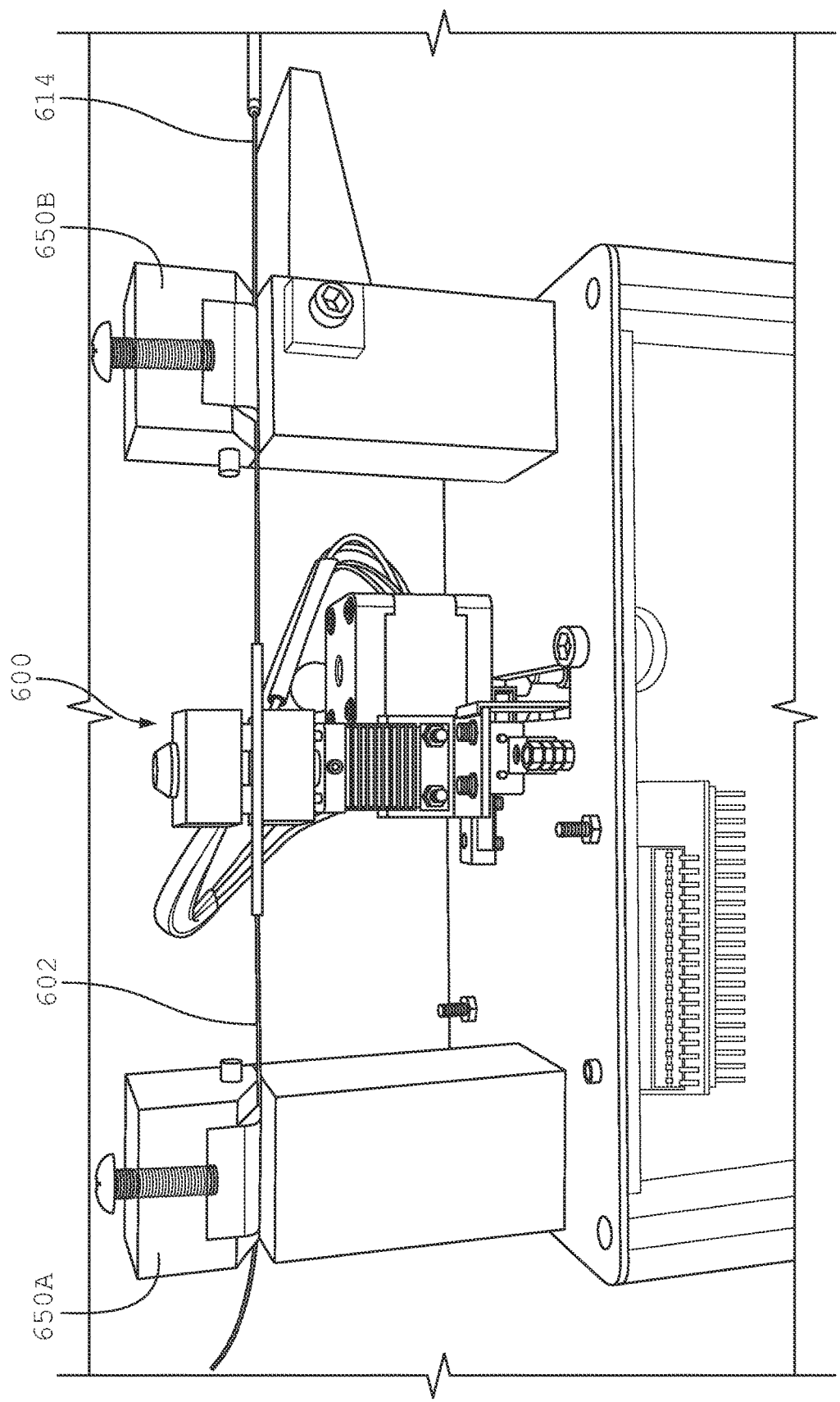

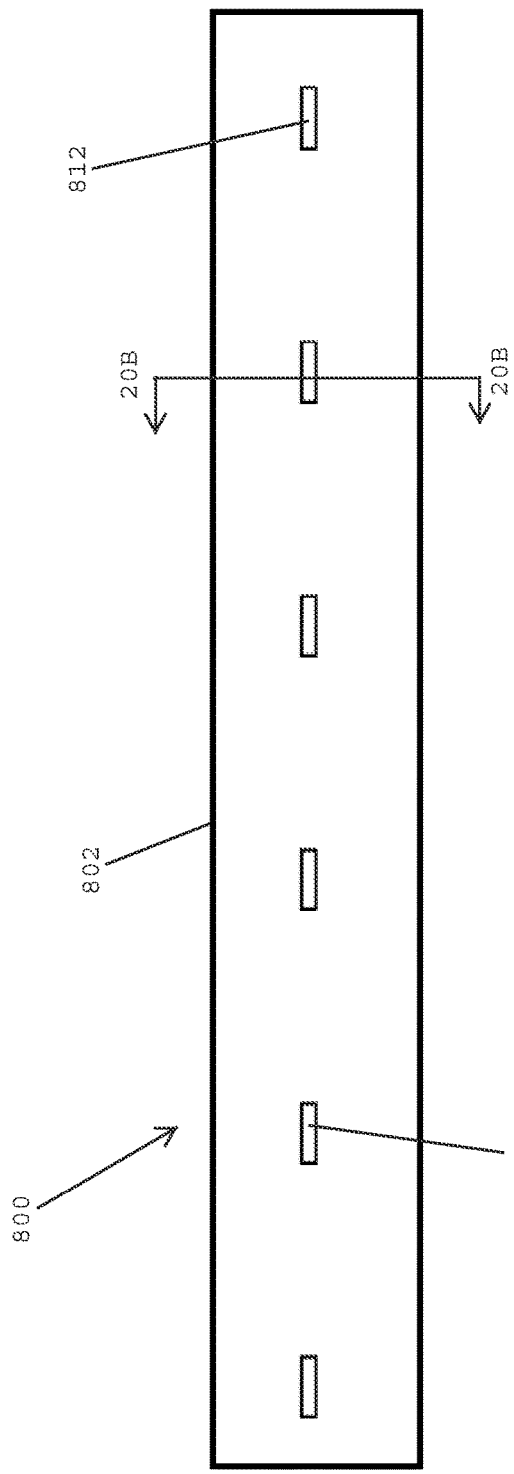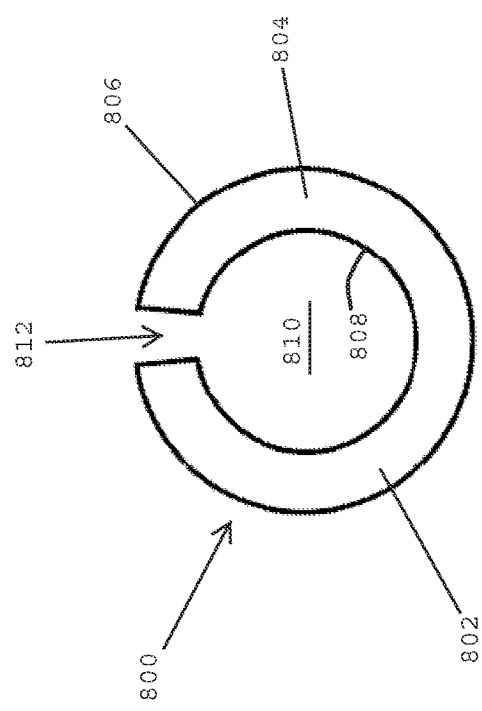
FIG. 19A
FIG. 19B

CATHETERS HAVING VISIBLE MARKERS FOR IDENTIFYING SOAKER REGIONS CONTAINING FLUID OPENINGS

CROSS-REFERENCE TO RELATED APPLICATIONS

The present patent application claims benefit of U.S. Provisional Application Ser. No. 63/226,384, filed on Jul. 28, 2021, and is related to commonly assigned U.S. patent application Ser. No. 17/814,558, filed on Jul. 25, 2022, entitled, "METHODS OF MAKING CATHETERS HAVING VISIBLE MARKERS FOR IDENTIFYING SOAKER REGIONS CONTAINING FLUID OPENINGS FOR INFUSING AND DRAINING FLUIDS FROM PATIENTS", the disclosures of which are hereby incorporated by reference herein.

BACKGROUND OF THE INVENTION

Field of the Invention

The present patent application is generally related to medical devices, and is more specifically related to catheters that are implanted in patients for infusing fluids into patients and draining fluids from patients.

Description of the Related Art

Many medical treatment protocols involve infusing therapeutic fluids into selected areas of a patient's body. Therapeutic fluids that are typically employed by physicians for treating patients include anesthetics, antibiotics, antimicrobial agents, chemotherapy agents, and growth factors.

Historically, therapeutic fluids have been delivered to patients using catheters that are temporarily implanted in the patients for delivering the therapeutic fluids during a treatment period. At the end of the treatment period, the catheters are removed from the patients.

Catheters are also used to drain fluids from patients. Following surgery, bodily fluids accumulate in the area of the surgical site and around wounds. Catheters are used to drain the bodily fluids from the patient for enhancing healing and recovery.

Typically, catheters include an elongated hollow tube having a lumen that extends along the length of the catheter. The elongated hollow tube has an outer wall with a plurality of fluid openings that are in communication with the lumen of the catheter. During infusion procedures, therapeutic fluid is directed into the lumen and through the fluid openings for bathing surrounding tissue with the therapeutic fluid. During draining procedures, bodily fluids may be drawn through the fluid openings and into the lumen for being removed from the patient.

Catheters are typically held in place using sutures or other fixation devices (e.g., staples).

Catheters may also be held in place using barbs. For example, US 2021/0077776 to Cichocki et al., assigned to Cilag GmbH International, the disclosure of which is hereby incorporated by reference herein, teaches an absorbable, biocompatible barbed microcatheter for delivering therapeutic fluids to a patient. The barbed microcatheter includes a hollow tube having an elongated lumen that extends between proximal and distal ends of the hollow tube, a plurality of barbs projecting from the hollow tube, and a plurality of fluid egress openings formed in the hollow tube that are in fluid communication with the elongated lumen. The fluid egress openings are evenly spaced from one another along the length of the hollow tube. An anchor is secured to the proximal end of the hollow tube, and a surgical needle is secured to the distal end of the hollow tube.

Identifying a location on a catheter that that can be used for infusing fluids into a patient or draining fluids from the patient is important. In many instances, the fluid openings in a catheter are not located along the entire length of the catheter, but are only located in a particular section of a catheter. For example, a first section of a catheter may have no fluid openings and a second section of a catheter may have fluid openings.

After a catheter has been implanted inside a patient, it may be difficult for medical personnel to determine where the fluid openings in the catheter are located along the length of the catheter. For infusion and drainage procedures, it is critical that medical personnel are able to position the fluid openings at particular locations inside the patient.

Unfortunately, conventional catheters do not have visible markers that can be utilized by medical personnel to readily identify the location of the fluid openings that are used for draining and infusing fluids.

In view of the above-noted deficiencies and requirements, there is a continuing need for improved catheters that incorporate visible indicators that may be used by medical personnel to identify the locations on the catheters that can be used to infuse or drain fluids. The need for catheters having visible indicators is particularly acute for smaller diameter catheters such as microcatheters.

SUMMARY OF THE INVENTION

In one embodiment, a catheter has one or more visible markers that may be utilized by medical personnel to identify a location or section of the catheter that may be used to infuse fluids into a patient or drain fluids from a patient.

In one embodiment, a method of making a catheter having a visible marker for distinguishing proximal and distal sections of the catheter preferably includes obtaining a hollow tube having a proximal section, a distal section, an elongated conduit extending through the proximal and distal sections, and one or more fluid openings formed in the distal section of the hollow tube that are in fluid communication with the elongated lumen.

In one embodiment, the method may include inserting a mandrel within the elongated lumen of the hollow tube. The mandrel preferably supports the inner diameter of the hollow tube and prevents the hollow tube from being compressed and/or collapsing inwardly as a visible marker is secured to the hollow tube.

In one embodiment, the method may include positioning a first visible marker (e.g., a visible marker tube, a visible marker collar) over an outer surface of the hollow tube at a junction of the proximal and distal sections of the hollow tube. In one embodiment, the first visible marker may be placed at a location that devices the proximal section of the catheter from the distal section of the catheter.

In one embodiment, the method preferably includes placing a sacrificial material (e.g., a sacrificial tube, a sacrificial collar) over the first visible marker so that the first visible marker is completely covered by the sacrificial material.

In one embodiment, heat may be applied to the sacrificial material, the first visible marker, and the hollow tube for shrinking the sacrificial material, which, in turn, compresses the first visible marker against the outer surface of the hollow tube of the catheter. In addition, the heat may be conductive through the sacrificial material for reaching the first visible marker for at least partially melting the first visible marker for fusing, welding and/or securing the first visible marker to the outer surface of the hollow tube of the catheter.

In one embodiment, the heat may be applied within a temperature range of 190-220 degrees Celsius for about 4-16 seconds.

In one embodiment, the heat may be applied at about 205 degrees Celsius for about 10 seconds.

In one embodiment, the applying heat step may include disposing the sacrificial material between opposing heat emitting surfaces of first and second heater blocks. The opposing heat emitting surfaces emit heat, which, in turn, heats the sacrificial material. In one embodiment, the opposing heat emitting surfaces of the respective first and second heater blocks may be spaced away from one another by a distance of about 1.5-3.0 mm.

In one embodiment, the first visible marker may comprise a polymer material, and the heat is applied within a temperature range of about +/−15 degrees Celsius from the Melt Point of the polymer material of the first visible marker for about 4-16 seconds.

In one embodiment, the heat is applied within a temperature range of about +/−1.0 degrees Celsius from the Melt Point of the polymer material of the first visible marker for about 10 seconds.

In one embodiment, the material (e.g., polymers; MONOCRYL) that is used to make the visible markers (e.g., visible marker tubes) may be extruded. In one embodiment, the methodology that is utilized for extruding the visible marker material may impact the polymer orientation of the material, which, in turn, may impact the amount of shrinkage in length and/or the radial expansion of the visible marker material when the visible marker material is heated for bonding and/or fusing the visible marker to a catheter or a hollow tube.

Although the present patent application is not limited by any particular theory of operation, it is believed that a visible marker material that is highly oriented (e.g., high polymer orientation) and/or has a high tensile strength will, upon being heated, show greater shrinkage along its length and also a greater increase in outer diameter (i.e., radial expansion). Upon heating, the visible marker material will tend to relax (i.e., un-orient), which results in shrinkage along its length and expansion in the outer diameter. It has been observed that the greater the degree of orientation of the visible marker material, the more the visible marker material will shrink along its length and expand radially.

Experiment. Upon being heated, visible marker tubes were evaluated for shrinkage in length and expansion in outer diameter. A first visible marker tube having a lower polymer orientation had a shrinkage in length of about 10-12% and an outer diameter of 1.07 mm. A second visible marker tube having a greater polymer orientation (than the first visible marker tube) had a shrinkage in length of about 30-40% and an outer diameter of 1.27 mm.

Thus, in one embodiment, it may be preferable to minimize and/or reduce as much as possible the orientation of the material that is used to make the visible markers (e.g., visible marker tubes) so as to minimize shrinkage in length and/or minimize radial expansion when the visible marker material is heated to bond/fuse it to a catheter or hollow tube.

In one embodiment, after fusing, welding and/or securing the first visible marker to the outer surface of the hollow tube, the sacrificial material may be removed (e.g., peeled away) to fully expose the first visible marker, and the mandrel may be removed from the elongated lumen of the hollow tube.

In one embodiment, the first visible marker may be a visible marker tube or collar having a first length, and the sacrificial material may be a sacrificial tube having a second length that is greater than the first length of the visible marker tube. In one embodiment, the hollow tube of the catheter desirably has a third length that is greater than the second length of the sacrificial tube.

In one embodiment, during the applying heat step, one or more sections of a hollow tube that are located beyond the first length of the visible marker collar may be at least partially constrained for preventing the hollow tube from shrinking along its longitudinal axis while simultaneously preventing the hollow tube from expanding in a radial direction.

In one embodiment, the hollow tube and the first visible marker may be made of polymeric materials, such as Monocryl or polydioxanone (PDS). In one embodiment, the hollow tube and the first visible marker may be made of the same polymeric material (e.g., a Monocryl polymer).

In one embodiment, the sacrificial material that covers the first visible marker may be PTFE.

In one embodiment, the first visible marker is a visible marker collar that extends around an outer surface of the hollow tube. In one embodiment, the first visible marker includes a dye or a pigment that defines a first color. In one embodiment, the first visible marker is a dyed Monocryl collar or tube. In one embodiment, the dyed Monocryl collar or tube has the color violet. In one embodiment, the dyed Monocryl collar or tube has about 0.04-0.05% D&C Violet 2 as defined in the Code of Federal Regulations at 21 CFR 74.1602. In one embodiment, the visible marker tube may include a radiopaque material.

In one embodiment, the hollow tube of the catheter is made of a translucent or transparent material.

In one embodiment, the hollow tube may have a second color that contrasts with the first color of the first visible marker.

In one embodiment, the hollow tube has an outer diameter, and the visible marker collar has a central opening that defines an inner diameter that is equal to or slightly larger than the outer diameter of the hollow tube.

In one embodiment, the method may include disposing a second visible marker within the elongated lumen of the hollow tube. The second visible marker preferably extends between the junction of the proximal and distal sections of the hollow tube and a distal end of the hollow tube. In one embodiment, a distal end of the second visible marker may be secured to the distal end of the hollow tube for fixing the second visible marker in place within the hollow tube.

The second visible marker may be a fiber, such as a Monocryl fiber. In one embodiment, the second visible marker is a dyed Monocryl fiber (e.g., a dyed Monocryl fiber having about 0.04-0.05% D&C Violet 2 as defined by 21 CFR 74.1602). In one embodiment, the second visible marker may include a radiopaque material. In one embodiment, the distal end of the hollow tube of the catheter and the dyed Monocryl fiber are sealed via ultrasonic welding. The weld secures the distal end of the dyed Monocryl fiber and fixes it in place within the elongated lumen of the hollow body of the catheter.

In one embodiment, the mandrel preferably has an outer diameter that closely matches an inner diameter of the elongated lumen of the hollow tube for supporting the hollow tube and preventing the hollow tube from collapsing inwardly when fusing, welding and/or securing the first visible marker to the outer surface of the hollow tube.

In one embodiment, a needle, such as a curved suture needle, may be attached to a proximal end of the hollow tube. The needle may be attached to the proximal end of the hollow tube after the mandrel has been removed from the elongated lumen.

In one embodiment, the distal section of the hollow tube may be implanted inside a patient for infusing fluid into the patient or draining fluid from the patient. The needle may be used for implanting the catheter in a patient.

In one embodiment, a method of making a catheter having a visible marker for distinguishing proximal and distal sections of the catheter preferably includes obtaining a hollow tube having a proximal section, a distal section, an elongated conduit extending through the proximal and distal sections, and one or more fluid openings formed in the distal section of the hollow tube that are in fluid communication with the elongated lumen, and inserting a mandrel within the elongated lumen of the hollow tube for supporting an inner diameter of the hollow tube and preventing the hollow tube from collapsing inwardly into the elongated lumen.

In one embodiment, the method may include positioning a visible marker collar or tube over an outer surface of the hollow tube at a junction of the proximal and distal sections of the hollow tube, and placing a sacrificial tube over the visible marker collar, whereby the sacrificial tube has a greater length than the visible marker collar so that the visible marker collar is completely covered by the sacrificial tube.

In one embodiment, the method may include applying heat to the sacrificial tube, the visible marker collar, and the hollow tube for shrinking the sacrificial tube, which, in turn, compresses the visible marker collar against the outer surface of the hollow tube. The heat preferably passes through the sacrificial tube and into the visible marker collar for at least partially melting the visible marker collar for fusing, welding and/or securing the visible marker collar to the outer surface of the hollow tube.

In one embodiment, after securing the visible marker collar to the outer surface of the hollow tube, the sacrificial tube may be removed (e.g., cut away, peeled away) to fully expose the visible marker collar, and the mandrel may be removed from the elongated lumen of the hollow tube.

In one embodiment, the hollow tube has an outer diameter, and the visible marker collar has a central opening that defines an inner diameter that is equal to or slightly larger than the outer diameter of the hollow tube.

In one embodiment, a second visible marker, such as a visible marker filament, may be disposed within the elongated lumen of the hollow tube. In one embodiment, the visible marker filament extends between the junction (e.g., a dividing line) of the proximal and distal sections of the hollow tube and a distal end of the hollow tube.

In one embodiment, a distal end of the visible marker filament may be secured to the distal end of the hollow tube, such as by using ultrasonic welding.

In one embodiment, after removing the mandrel from the hollow tube, a needle may be attached to a proximal end of the hollow tube.

In one embodiment, a catheter for delivering fluids preferably includes a hollow tube having a proximal section, a distal section, and an elongated lumen that extends through the proximal and distal sections of the hollow tube.

In one embodiment, the catheter is made of a polymer material and has a longitudinal axis that extends along the length of the catheter. In one embodiment, the polymer material of the catheter exhibits a molecular orientation in the longitudinal direction having a draw ratio in excess of four (4). As used herein, the terminology draw ratio means the length of a material that is drawn relative to the length of the material before it is drawn (i.e., undrawn). For example, a polymer material having an initial length of one foot and a drawn length of four feet would have a draw ratio of four (4).

Although the present patent application is not limited by any particular theory of operation, it is believed that providing a catheter made of a polymer material (e.g., MONOCRYL polymer) and having a draw ratio of at least four (4) will prevent the catheter from being tacky and/or excessively difficult to process.

In one embodiment, the catheter preferably includes one or more fluid openings formed in the distal section of the hollow tube that are in fluid communication with the elongated lumen of the hollow tube.

In one embodiment, a first visible marker (e.g., a visible marker tube) is secured to an outer surface of the hollow tube. In one embodiment, the first visible marker has the shape of a tube or a collar that extends around the outer surface of the hollow tube.

In one embodiment, the first visible marker is located at a junction of the proximal and distal sections of the hollow tube.

In one embodiment, the hollow tube of the catheter and the first visible marker are made of the same polymeric material (e.g., Monocryl).

In one embodiment, the first visible marker includes a dye or a pigment that defines a first color. In one embodiment, the dyed first visible marker has about 0.04-0.05% D&C Violet 2 as defined in 21 CFR 74.1602.

In one embodiment, the hollow tube of the catheter is made of a translucent or transparent material.

In one embodiment, the hollow tube of the catheter has a second color that contrasts with the first color of the first visible marker.

In one embodiment, the hollow tube has an outer diameter, and the visible marker tube has a central opening that defines an inner diameter that is equal to or slightly larger than the outer diameter of the hollow tube.

In one embodiment, a second visible marker (e.g., a fiber, a Monocryl fiber) is disposed within the elongated lumen of the hollow tube and extends between the junction of the proximal and distal sections of the hollow tube and a distal end of the hollow tube.

In one embodiment, the distal end of the hollow tube is sealed (e.g., by ultrasonic welding, by crimping), and a distal end of the second visible marker is secured to the sealed distal end of the hollow tube.

In one embodiment, the hollow tube, the first visible marker and the second visible marker are made of polymeric materials.

In one embodiment, the hollow tube, the first visible marker and the second visible marker are made of the same polymeric material.

In one embodiment, the first and second visible markers are the same color. In one embodiment, each of the first and second visible markers includes about 0.04-0.05% D&C Violet 2, as defined in the Code of Federal Regulations at 21 CFR 74.1602.

In one embodiment, a catheter preferably includes a hollow tube having an outer wall that extends from a proximal end to a distal end thereof. In one embodiment, the hollow tube may have a cross-sectional shape that defines a circle or an oval. In one embodiment, the outer wall of the hollow tube preferably has an outer surface and an inner surface that surrounds an elongated lumen that extends along the length of the hollow tube between the proximal and distal ends of the hollow tube. The elongated lumen is preferably configured to allow fluid to flow therethrough, such as fluid being drained from a patient or fluid being infused into a patient.

In one embodiment, the distal section of the hollow tube desirably includes one or more fluid openings that pass through the outer wall of the hollow tube. The one or more fluid openings desirably extend from the elongated lumen to the outer surface of the outer wall of the hollow tube. The one or more fluid openings are preferably in fluid communication with the elongated lumen.

In one embodiment, the distal section of the hollow tube that has the one or more openings may be referred to as the "soaker region" of the catheter.

In one embodiment, the soaker region may be utilized for infusing fluid into a patient via the elongated lumen and the one or more fluid openings formed in the outer wall of the hollow tube. In one embodiment, fluid may be directed into the elongated lumen at the proximal end of the hollow tube, whereupon the fluid flows distally through the elongated lumen and toward the distal end of the hollow tube for passing through the one or more fluid openings provided in the distal section of the hollow tube.

In one embodiment, the soaker region of the catheter may be utilized for draining fluid (e.g., bodily fluid that accumulates around a wound) from a patient via the lumen and the one or more fluid openings formed in the outer wall of the hollow tube. In one embodiment, a vacuum may be generated in the elongated lumen for drawing bodily fluids through the one of more fluid openings and into the elongated lumen for draining the bodily fluids from a patient. The drained fluids preferably flow through the elongated lumen and toward the proximal end of the hollow tube for being removed from the patient.

In one embodiment, a catheter may include a first visible marker that is affixed to the hollow tube to enable medical personnel to differentiate the proximal section of the hollow tube from the distal section of the hollow tube, whereby the distal section has the one or more fluid openings for draining or infusing fluid.

In one embodiment, the first visible marker may be secured to the hollow tube at a junction of the proximal and distal sections of the hollow tube of the catheter. In one embodiment, the first visible marker may provide a visual indicator of where the soaker region (i.e., the section of the hollow tube having the one or more fluid opening) of the catheter commences In one embodiment, the first visible marker may include a collar or tube-shaped component that is secured (e.g., fused, welded) over an outer surface of the outer wall of the hollow tube of the catheter. The first visible marker may have a color (e.g., purple, red, blue). In one embodiment, the first visible marker may be made of a polymeric material. In one embodiment, the hollow tube and the first visible marker may be made of the same polymeric material (e.g., Monocryl).

In one embodiment, a hollow tube of a catheter may include a second visible marker that is utilized by medical personnel for identifying the soaker region of the catheter. In one embodiment, the second visible marker preferably extends along the length of the distal section of the catheter. In one embodiment, the second visible marker may include an elongated filament that is positioned within the elongated lumen of the hollow tube. In one embodiment, the elongated filament may be centrally located within the elongated lumen and extend along a central axis of the elongated lumen. In one embodiment, the elongated filament may have a color (e.g., purple, red, blue) that is visible through the transparent or translucent hollow tube of the catheter.

In one embodiment, a method of making a catheter having a first visible marker for distinguishing proximal and distal sections of the catheter preferably includes obtaining a hollow tube having a proximal section and a distal section. In one embodiment, the hollow tube is preferably made of a material that is transparent or translucent, such as a polymer material. In one embodiment, the hollow tube has an elongated lumen that extends between proximal and distal ends thereof. In one embodiment, the distal section of the hollow tube has one or more fluid openings that are in fluid communication with the elongated lumen.

The one or more fluid openings, preferably located within the soaker region of the hollow tube may be used for infusing fluids into a patient or draining fluids from a patient.

In one embodiment, a method of making the catheter having the first visible marker preferably includes inserting a mandrel within the elongated lumen of the hollow tube. In one embodiment, the mandrel (e.g., an elongated rod) preferably has an outer diameter that closely matches the inner diameter of the elongated lumen of the hollow tube of the catheter for supporting the hollow tube and preventing the hollow tube from collapsing inwardly when securing the first visible marker to the outer surface of the hollow tube of the catheter.

In one embodiment, the method desirably includes positioning the first visible marker (e.g., a polymeric tube or collar) over the outer surface of the hollow tube of the catheter. The first visible marker is preferably positioned at a location that divides the proximal section of the hollow tube from the distal section of the hollow tube.

In one embodiment, the first visible marker has the shape of a hollow tube, or a collar and the inner diameter of the first visible marker is preferably the same or slightly larger than the outer diameter of the hollow tube of the catheter.

In one embodiment, the method preferably includes placing a sacrificial tube, such as a polymeric tube or collar made of PTFE, over the first visible marker so that the first visible marker is completely covered by the sacrificial tube. In one embodiment, the sacrificial tube has a length that is greater than the length of the first visible marker so that the sacrificial tube completely covers the ends of the first visible marker.

In one embodiment, the method may include applying heat to the assembly of the sacrificial tube, the first marker, and the hollow tube for a predetermined period of time and within a predetermined temperature range. Applying heat to the sacrificial tube causes the sacrificial tube to shrink in size for reducing the diameter of the sacrificial tube. As the sacrificial tube shrinks, the sacrificial tube compresses the first visible marker against the outer surface of the hollow tube of the catheter.

The heat applied to the assembly passes through the sacrificial tube to the first visible marker to at least partially melt the polymeric material of the first visible marker to fuse the first visible marker to the outer surface of the hollow tube of the catheter.

In one embodiment, after the visible marker has been at least partially melted and fused to the outer surface of the hollow tube of the catheter, the sacrificial tube may be removed, such as by peeling away the sacrificial tube to expose the first visible marker that has been fused and/or welded to the outer surface of the hollow tube of the catheter.

In one embodiment, after the first visible marker has been welded and/or fused to the outer surface of the hollow tube of the catheter, the mandrel may be removed from the elongated lumen of the hollow tube of the catheter.

In one embodiment, the first visible marker tube is shorter in length than both the hollow body of the catheter and the sacrificial tube.

In one embodiment, the first visible marker has a first length, and the sacrificial tube has a second length that is greater than the first length of the first visible marker.

In one embodiment, the sacrificial tube is shorter than the length of the hollow tube of the catheter.

In one embodiment, the first visible marker preferable contains a dye or a pigment.

In one embodiment, the hollow tube of the catheter is preferably clear or translucent, or has a color that contrasts with the color of the dye or pigment (e.g., 0.04-0.05% D&C Violet 2) incorporated into the first visible marker.

In one embodiment, a method of making a catheter may include disposing a second visible marker, such as a visible marker filament, inside an elongated lumen of a hollow tube of a catheter and affixing the second visible marker within the elongated lumen. In one embodiment, the visible marker filament may be fixed to the catheter by crimping the distal end of the visible marker filament to the distal end of the hollow tube of the catheter.

In one embodiment, the first visible marker (e.g., a marker tube or collar) and the second visible marker (e.g., a visible marker filament) may be made of the same material as the hollow tube of the catheter.

In one embodiment, a catheter may include one or more visible demarcations or visible markers that are adjacent one another.

In one embodiment, a needle, such as a curved suture needle, may be attached to the proximal end of the hollow tube of the catheter.

In one embodiment, the method preferably includes placing a first visible marker (e.g., dyed Monocryl tubing) over the outer surface of the hollow body of the catheter and positioning the first visible marker at a location that defines the beginning of the soaker region of the catheter.

In one embodiment, the method preferably includes placing a sacrificial tube made of a heat shrink material (e.g., PTFE) over the first visible marker and applying heat to the sacrificial tube to compress the heat shrink material of the sacrificial tube. The heat may be applied via heating dies or lasers.

In one embodiment, as the heat is applied, the heat shrink material of the sacrificial tube compresses onto the first visible marker (e.g., a dyed Monocryl collar) and the heat energy bonds and/or fuses the first visible marker to the outer surface of the hollow tube of the catheter.

In one embodiment, after the first visible marker is fused and/or welded to the outer surfaced of the hollow tube of the catheter, the sacrificial layer may be removed (e.g., peeled off the first visible marker and the hollow tube of the catheter), which leaves the first visible marker secured to the outer surface of the hollow tube of the catheter. In one embodiment, the mandrel may be removed from the elongated lumen of the catheter.

In one embodiment, a method of making a catheter having one or more visible demarcations for designating a soaker region of the catheter preferably includes inserting a visible marker filament (e.g., a dyed Monocryl fiber) into a distal end (i.e., opposite end to the needle) of a hollow tube of the catheter, whereupon the visible marker filament extends within the elongated lumen and along the length of the hollow tube of the catheter. In one embodiment, the visible marker filament may have a length of between about 2-8 inches, and more preferably optional lengths of about 2.5 inches, 5 inches, and 8 inches.

In one embodiment, the distal end of the hollow tube may be sealed and/or crimped, such as by using ultrasonic welding, for engaging a distal end of the visible marker filament and fixing the visible marker filament in place within the elongated lumen of the hollow tube of the catheter.

One benefit of providing a catheter having one or more visible markers is that medical personnel (e.g., surgeons) can immediately identify where the proximal section of a catheter ends and where the distal section of the catheter, containing the soaker region, starts.

In one embodiment, a catheter may include a first visible marker, such as a visible marker tube or collar, for designating the start of a soaker region of the catheter. In one embodiment, both the hollow tube of the catheter and the first visible marker (e.g., a marker tube, a marker collar) are made of absorbable materials that absorb at the same time in a patient so that the catheter does not have to be removed from the patient.

In one embodiment, a catheter may include a second visible marker, such as a visible marker filament, for designating the start of a soaker region of the catheter.

In one embodiment, a catheter may include both the first visible marker (e.g., the visible marker tube) and the second visible marker (e.g., the visible marker filament) for designating the start of a soaker region of the catheter.

In one embodiment, a catheter may include a visible marker filament for designating the start of the soaker region of the catheter.

These and other preferred embodiments of the present patent application will be described in more detail herein.

BRIEF DESCRIPTION OF THE DRAWINGS

FIG. 1A is a top view of a section of a catheter used for draining and infusing fluids, the catheter including a hollow tube having fluid openings spaced along the length of the hollow tube, in accordance with one embodiment of the present patent application.

FIG. 1B is a cross-sectional view of the hollow tube of the catheter shown in FIG. 1A.

FIG. 3A shows a second stage of a method of making a catheter having a visible marker for indicating the start of a soaker region on the catheter, in accordance with one embodiment of the present patent application.

FIG. 3B is a cross-sectional view of the subassembly shown in FIG. 3A.

FIG. 4A shows a third stage of a method of making a catheter having a visible marker for indicating the start of a soaker region on the catheter, in accordance with one embodiment of the present patent application.

FIG. 4B is a cross-sectional view of the subassembly shown in FIG. 4A.

FIG. 5A shows a fourth stage of a method of making a catheter having a visible marker for indicating the start of a soaker region on the catheter, in accordance with one embodiment of the present patent application.

FIG. 5B is a cross-sectional view of the subassembly shown in FIG. 5A.

FIG. 6A shows a fifth stage of a method of making a catheter having a visible marker for indicating the start of a soaker region on the catheter, in accordance with one embodiment of the present patent application.

FIG. 6B is a cross-sectional view of the subassembly shown in FIG. 6A.

FIG. 7A shows a sixth stage of a method of making a catheter having a visible marker for indicating the start of a soaker region on the catheter, in accordance with one embodiment of the present patent application.

FIG. 7B is a cross-sectional view of the subassembly shown in FIG. 7A.

FIG. 8A shows a seventh stage of a method of making a catheter having a visible marker for indicating the start of a soaker region on the catheter, in accordance with one embodiment of the present patent application.

FIG. 8B is a cross-sectional view of the subassembly shown in FIG. 8A.

FIG. 9A shows an eighth stage of a method of making a catheter having a visible marker for indicating the start of a soaker region on the catheter, in accordance with one embodiment of the present patent application.

FIG. 9B is a cross-sectional view of the subassembly shown in FIG. 9A.

FIG. 10A shows a ninth stage of a method of making a catheter having a visible marker for indicating the start of a soaker region on the catheter, in accordance with one embodiment of the present patent application.

FIG. 10B is a cross-sectional view of the subassembly shown in FIG. 10A.

FIG. 12 is a cross-sectional view of the catheter and the visible marker tube shown in FIG. 11.

FIG. 13A is a schematic view of a soaker region of a catheter including a visible marker tube secured to an outer surface of a hollow tube of the catheter and a visible marker filament disposed within a lumen of the catheter and secured to a sealed distal end of the hollow tube of the catheter, in accordance with one embodiment of the present patent application.

FIG. 13B is a cross-sectional view of the catheter, the visible marker tube, and the visible marker filament shown in FIG. 13A.

FIG. 14 is a perspective view of a catheter having a proximal section, a distal section with a soaker region, a visible marker tube secured to an outer surface of a hollow tube of the catheter, and a visible marker filament disposed within an elongated lumen of the catheter and secured to a distal end of the hollow tube of the catheter to provide two visible markers that indicate the start of the soaker region of the catheter, in accordance with one embodiment of the present patent application.

FIG. 15A is a schematic view of a soaker region of a catheter including a visible marker filament disposed within an elongated lumen of the catheter, the visible marker filament having a distal end that is secured to a distal end of a hollow tube of the catheter, in accordance with one embodiment of the present patent application.

FIG. 15B is a cross-sectional view of the catheter and the visible marker filament shown in FIG. 15A.

FIG. 17E shows a heating system during a fifth stage of a method of fusing a visible marker tube to an outer surface of an elongated body of a catheter to provide a visual indicator of the start of a soaker region of the catheter, in accordance with one embodiment of the present patent application.

FIG. 19A is a top view of a section of a catheter including a hollow tube having spaced slits formed in an outer wall of the hollow tube, the spaced slits being configured for draining and infusing fluid, in accordance with one embodiment of the present patent application.

FIG. 19B is a cross-sectional view of the catheter having spaced slits shown in FIG. 19A.

DETAILED DESCRIPTION OF PREFERRED EMBODIMENTS

Figure 2A:
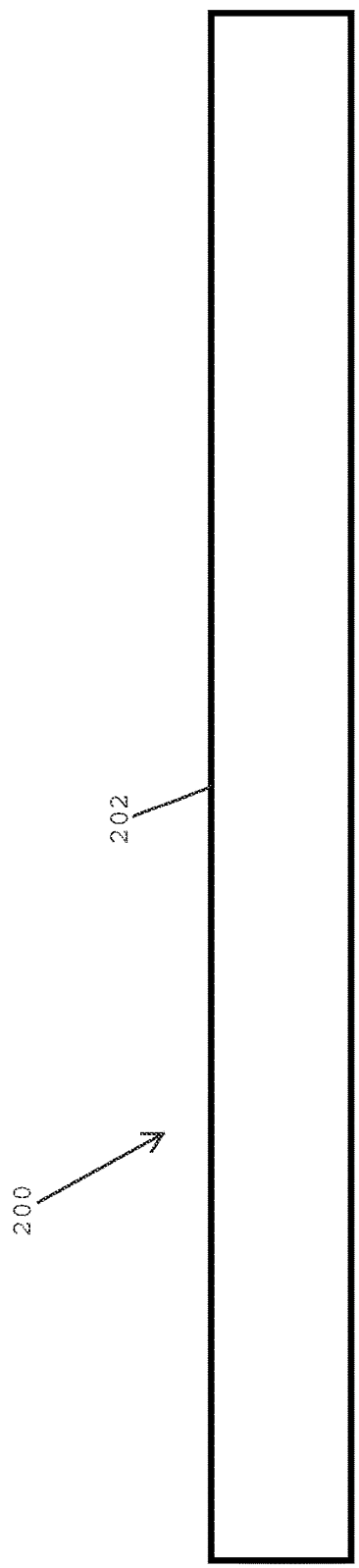
FIG. 2A shows a first stage of a method of making a catheter having a visible marker for indicating the start of a soaker region on the catheter, in accordance with one embodiment of the present patent application.

Referring to FIGS. 1A and 1B, in one embodiment, a section of a catheter 100 preferably includes a hollow tube 102 including an outer wall 104 having an outer surface 106 and an inner surface 108 that surrounds an elongated lumen 110 that extends along the length of the catheter 100. In one embodiment, a fluid may pass through the elongated lumen 110 for draining fluid (e.g., bodily fluids) from a patient and/or infusing fluid (e.g., therapeutic fluids) into a patient.

In one embodiment, the catheter 100 is desirably made of an absorbable, biocompatible polymer so that the catheter will absorb and will not have to be removed from the patient at the end of a therapy period.

In one embodiment, the catheter 100 may be tube-shaped. In one embodiment, the catheter 100 may include a flexible tube. In one embodiment, when viewed in cross-section, the outer wall 104 of the catheter 100 may have the shape of a circle or oval.

In one embodiment, the hollow tube 102 of the catheter 100 preferably includes a plurality of fluid openings 112 that extend through the outer wall 104. In one embodiment, the fluid openings 112 are in fluid communication with the elongated lumen 110. In one embodiment, the fluid openings extend from the inner surface 108 to the outer surface 106 of the outer wall 104. In one embodiment, the fluid openings 112 may be spaced from one another along the length of the catheter 100. The size of the fluid openings may vary along the length of the catheter.

In one embodiment, the fluid openings 112 may be in alignment with one another along the length of the hollow tube 102 of the catheter 100, or may be spaced from one another around the perimeter of the outer wall 104 of the hollow tube 102 of the catheter 100. In one embodiment, the fluid openings 112 may be spaced in a random pattern along the length of the hollow tube 102.

In one embodiment, each of the fluid openings 112 is preferably in fluid communication with the elongated lumen 110 for enabling fluid to be drained through the fluid openings 112 and into the elongated lumen and/or for enabling fluid that is directed into the lumen 110 to pass through the fluid openings 112 for infusing the fluid into a patient.

In one embodiment, the catheter 100 may have a proximal section that is configured for being located outside of a patient and a distal section that is configured for remaining inside a patient for draining fluid and/or infusing fluid. In one embodiment, the spaced fluid openings 112 may be located in only the distal section of the catheter 100, which is adapted to remain inside a patient. In one embodiment, the distal section of the catheter that has the fluid openings 112 may be referred to as a "soaker region" of the catheter.

In one embodiment, the catheter 100 preferably has a total length of about 10-40 inches, and more preferably about 24 inches.

In one embodiment, the distance $D_1$ between adjacent, spaced fluid openings 112 may be about 4-25 millimeters, and more preferably about 4-12 millimeters. In one embodiment, the spaced fluid openings may be the same size (i.e., same diameter). In one embodiment, the spaced fluid egress openings may have different sizes (i.e., different diameters).

In one embodiment, the size of the fluid openings increases between the proximal end and the distal end of the hollow tube 102. The sizes of the fluid openings may become progressively larger along the length of the hollow tube (e.g., progressively larger between the proximal end the distal end of the hollow tube), with smaller openings near a fluid source and larger openings further away from the fluid source for maintaining a constant flow of fluid from the fluid openings.

Referring to FIG. 1B, in one embodiment, the outer surface 106 of the outer wall 104 of the hollow tube 102 preferably defines an outer diameter OD of about 0.8 millimeters. In one embodiment, the inner surface 108 of the outer wall 104 of the hollow tube 102 preferably defines an inner diameter $ID_1$ of about 0.5 millimeters. In one embodiment, the outer diameter OD defined by the outer wall 104 of the hollow tube 102 is about 1.5-2× greater than the inner diameter $ID_1$ defined by the inner surface 108 of the outer wall 104 of the hollow tube 102. In one embodiment, the outer wall 104 of the hollow tube 102 preferably has a thickness Ti of about 0.100-0.150 millimeters and more preferably about 0.140 millimeters.

In one embodiment, the fluid openings 112 pass completely through the thickness Ti of the outer wall 104 of the hollow tube 102 so that the fluid openings are in fluid communication with the elongated lumen 110 that extends along the length of the hollow tube. In one embodiment, the catheter 100 may be implanted into tissue, and a fluid, such as a therapeutic fluid, may be introduced into the elongated lumen 110 of the hollow tube 102, whereupon the fluid passes through the fluid openings 112 for bathing tissue that surrounds the hollow tube.

In one embodiment, a catheter having fluid openings is preferably made of an absorbable, biocompatible polymer material. The absorbable polymers may include conventional biocompatible, polymers such as lactide, polylactic acid, polyglycolic acid, glycolide, polydioxanone, polycaproactone, copolymers and blends thereof and the like.

As noted above, for clarity, FIGS. 1A and 1B show only one section of a catheter. The hollow tube of a catheter may extend to the left and/or the right of the catheter section shown in FIG. 1A. In one embodiment, a catheter having a full length desirably includes a proximal section and a distal section having one or more fluid openings that pass through the outer wall of the hollow tube 102. In one embodiment, the proximal section of the catheter has no fluid openings, and the distal section of the catheter has one or fluid openings.

In one embodiment, a needle, such as a curved suture needle, may be attached to a proximal end of the proximal section of the catheter. The needle may be used for implanting a catheter inside a patient.

In one embodiment, one or more visible markers and/or visible demarcations may be provided on and/or assembled with a catheter to offer one or more visual indications of where a particular section (e.g., a soaker region) of a catheter commences. The one or more visible demarcations preferably provide one or more visual indicators to surgical personnel so that the surgical personnel may identify the location of a catheter where the soaker region begins and/or where the fluid openings 112 (FIG. 1A) are located.

Figure 2B:
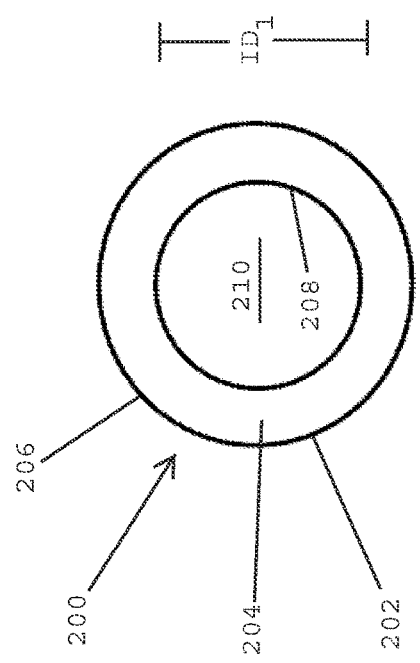
FIG. 2B is a cross-sectional view of the subassembly shown in FIG. 2A.

Referring to FIGS. 2A and 2B, in one embodiment, a method of making a catheter having one or more visible markers preferably includes obtaining a catheter 200 including a hollow tube 202. The hollow tube 202 preferably includes an outer wall 204 having an outer surface 206 and an inner surface 208 that surrounds an elongated lumen 210 that extends along the length of the hollow tube 202. Although not shown in FIGS. 2A and 2B, in one embodiment, the catheter 200 preferably includes a plurality of spaced openings that extend along the length of the catheter, which may be similar to the spaced openings 112 shown and described above in FIGS. 1A and 1B.

Referring to FIGS. 3A and 3B, in one embodiment, a method of making a catheter 200 having one or more visible markers preferably includes inserting a mandrel 214 into the elongated lumen 210 (FIG. 2B) of the hollow tube 202 of the catheter 200.

In one embodiment, the elongated lumen 210 (FIG. 2B) of the catheter 200 preferably defines an inner diameter $ID_1$ and the mandrel 214 has an outer diameter $OD_1$ that substantially matches the inner diameter $ID_1$ of the lumen of the catheter 200. In one embodiment, the mandrel 214 preferably supports the outer wall 204 of the hollow tube 202 to prevent the catheter from collapsing inwardly as the one or more visible markers are assembled with the catheter.

Referring to FIGS. 4A and 4B, in one embodiment, a method of making a catheter having one or more visible markers preferably includes positioning a first visible marker, such as a visible marker tube 216, over the outer surface 206 of the outer wall 204 of the hollow tube 202 of the catheter 200. The visible marker tube 216 preferably has an opening that defines an inner diameter $ID_2$ that is slightly larger than and/or matches the outer diameter $OD_2$ of the outer surface 206 of the outer wall 204 of the hollow tube 202 of the catheter 200.

In one embodiment, the first visible marker and the hollow tube of the catheter comprise polymer materials. In one embodiment, the first visible marker and the hollow tube of the catheter comprise the same polymer material (e.g., Monocryl polymer).

In one embodiment, the visible marker tube 216 is preferably located at a junction 215 of a proximal section 225 and a distal section 235 of the hollow tube 202. Thus, location of the visible marker tube 216 at the junction preferably enables surgical personnel to identify the location on the elongated tube where the distal section 235 (having the spaced fluid openings) starts.

As shown in FIGS. 4A and 4B, in one embodiment, the mandrel 214 continues to support the inner surface 208 of the outer wall 204 of the hollow tube 202 to prevent the hollow tube from collapsing inwardly into the elongated lumen 210 (FIG. 2B) that extends along the length of the catheter 200.

Referring to FIGS. 5A and 5B, in one embodiment, a method of making a catheter having one or more visible markers preferably includes placing a sacrificial material, such as a sacrificial tube 218, over both the visible marker tube 216 and the outer surface 206 of the outer wall 204 of the hollow tube 202 of the catheter 200. The sacrificial tube 218 may be made of a material that shrinks when exposed to heat, such as PTFE. In one embodiment, the visible marker tube 216 preferably has a length $L_1$ and the sacrificial tube 218 preferably has a length $L_2$ that is greater than the first length $L_1$ of the visible marker tube. Because it desirably has a greater relative length, the sacrificial tube 218 preferably encompasses the length of the visible marker tube 216 and desirably extends beyond the two ends of the visible marker tube 216.

Referring to FIGS. 6A and 6B, in one embodiment, the assembly shown in FIGS. 5A and 5B is desirably exposed to heat, such as from a heating system 220. In one embodiment, the heating system 220 heats the sacrificial tube 218 and the visible marker tube 216. The sacrificial tube 218 is made of a material (e.g., PTFE) that shrinks when exposed to heat. Thus, in response to the heat, the sacrificial tube 218 will shrink in size for compressing the visible marker tube 216 against the outer surface 206 of the hollow tube 202. In addition, the heat is preferable conducted through the sacrificial tube 218 and is transmitted to the visible marker tube 216 for at least partially melting the visible marker tube to fuse, weld and/or attach the visible marker tube 216 to the outer surface 206 of the outer wall 204 of the hollow tube 202 of the catheter 200.

As noted above, in one embodiment, the heat applied to the sacrificial tube 218 and the visible marker tube 216 may be generated by a heating assembly 220 that includes first and second heater blocks 222A, 222B.

In one embodiment, the first heater block 222A preferably has an inner face 224A that directs heat toward first sides (e.g., top sides) of the respective sacrificial tube 218 and the visible marker tube 216, which extend around the outer surface 206 of the outer wall 204 of the hollow tube 202 of the catheter 200.

In one embodiment, the second heater block 222B has an inner face 224B that directs heat toward respective second sides (e.g., undersides) of the respective sacrificial tube 218 and the visible marker tube 216, which extend around the outer surface 206 of the outer wall 204 of the hollow tube 202 of the catheter 200.

In one embodiment, the inner faces 224A, 224B of the respective first and second heater blocks 222A, 222B oppose one another and may be spaced away from one another by a distance $D_2$ of about 60-120 mils, or about 1.5-3.0 mm. In one embodiment, the sacrificial tube 218, the visible marker tube 216, and a section of the hollow tube 202 are disposed between the opposing inner faces 224A, 224B of the respective first and second heater blocks 222A, 222B.

In one embodiment, each of the respective first and second heater blocks 222A, 222B desirably has a width W (FIG. 6A) that is greater than the length $L_1$ (FIG. 5A) of the visible marker tube 216, but less than the length $L_2$ (FIG. 5A) of the sacrificial tube 218. Thus, the width W of the first and second heater blocks 222A, 222B encompasses the entire length $L_1$ (FIG. 5A) of the visible marker tube 216, however, the length $L_2$ (FIG. 5A) of the sacrificial tube 218 desirably extends beyond the bounds of the first and second heater blocks 222A, 222B.

Referring to FIGS. 7A and 7B, in one embodiment, as the first and second heater blocks 222A, 222B direct heat at the sacrificial tube 218 and the visible marker tube 216, a central region 245 of the sacrificial tube 218 that is generally aligned within the bounds of the first and second heater blocks 222A, 222B shrinks inwardly toward the central axis $A_1$ of the catheter 200. In one embodiment, the outer peripheral regions of the sacrificial tube 218 that lie outside the bounds of the first and second heater blocks 222A, 222B do not shrink like the central region 245 because the outer peripheral regions are exposed to less heat than the central region 245. As the sacrificial tube 218 shrinks inwardly, the sacrificial tube compresses the visible marker tube 216 against the outer surface 206 of the hollow tube 202 of the catheter 200.

In one embodiment, the heat generated by the heater blocks 222A, 222B preferably passes through the sacrificial tube 218 to reach the visible marker tube 216 for applying thermal energy to the visible marker tube 216. The heat at least partially melts an outer region of the visible marker tube 216 for welding the visible marker tube to the outer surface 206 of the outer wall 204 of the hollow tube 202 of the catheter 200.

Referring to FIGS. 8A and 8B, in one embodiment, after heat has been applied to the sacrificial tube 218 for shrinking a central region 245 of the sacrificial tube, which, in turn, compresses the visible marker tube 216 inwardly for welding the visible marker tube to the outer surface 206 of the hollow tube 202 of the catheter 200, the catheter assembly may be removed from the heating assembly 220 for undertaking further manufacturing steps.

Referring to FIGS. 8A and 8B, in one embodiment, after the visible marker tube 216 has been welded to the outer surface 206 of the hollow tube 202, the sacrificial tube 218 may be removed and/or peeled away. FIGS. 8A and 8B show the assembly prior to peeling away the sacrificial tube 218. FIGS. 9A and 9B show the assembly after the sacrificial tube 218 (FIGS. 8A and 8B) has been removed.

Referring to FIGS. 9A-9B and 10A-10B, after the visible marker tube 216 has been welded to the outer surface 206 of the hollow tube 202 of the catheter 200, the mandrel 214 that has supported the hollow tube 202 from collapsing inwardly into the elongated lumen, may be removed from the elongated lumen. FIGS. 9A and 9B show the assembly prior to removing the mandrel 214. FIGS. 10A and 10B show the catheter assembly after the mandrel has been removed from the lumen 210. After the mandrel has been removed, the catheter assembly 200 preferably includes the hollow tube 202 and the visible marker tube 216 welded to the outer surface 206 of the hollow tube 202. The lumen 210 (FIG. 10B) preferably extends along the length of the catheter 200.

Figure 11:
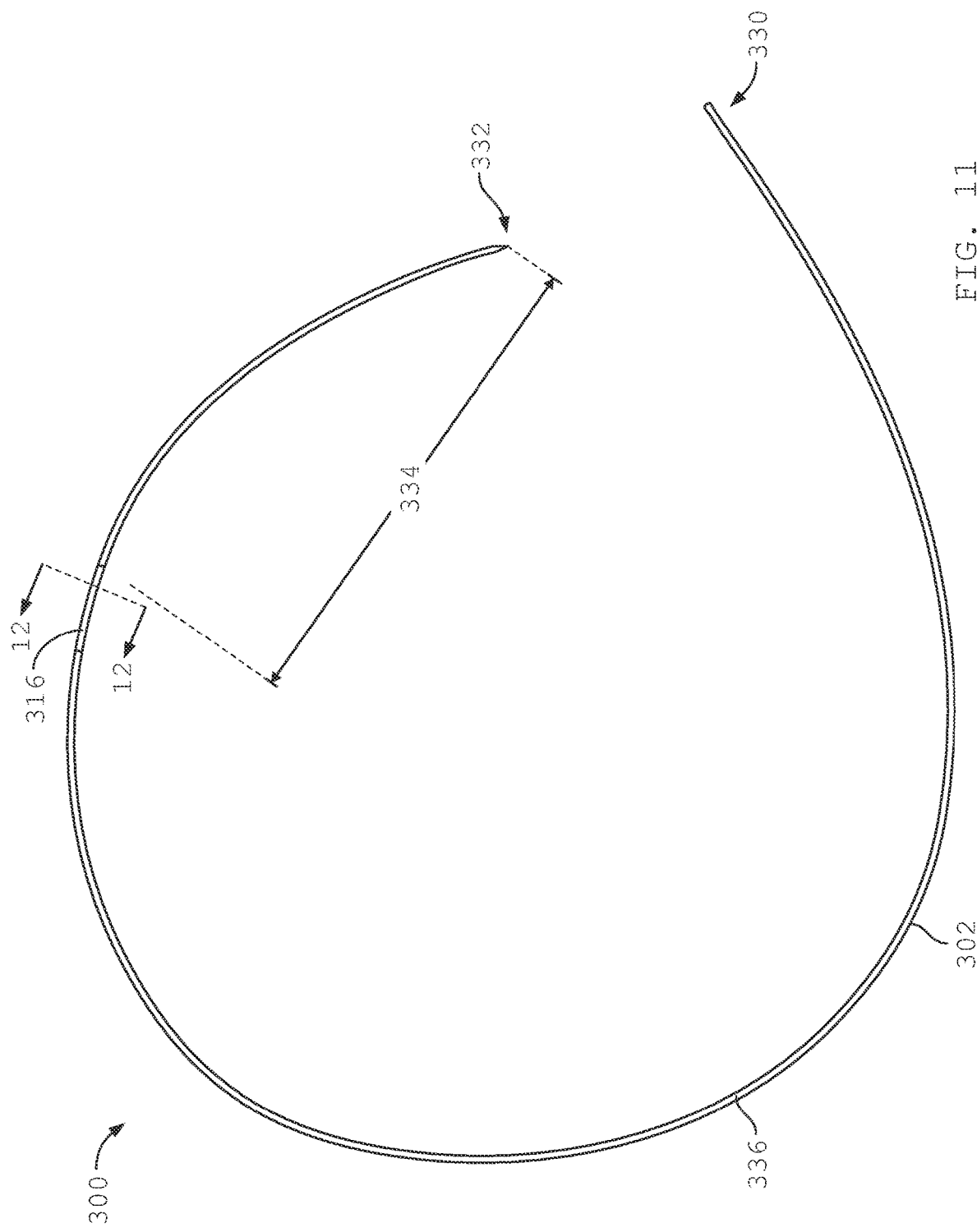
FIG. 11 is a perspective view of a catheter including a hollow tube having a proximal section, a distal section with a soaker region, and a visible marker tube at a junction of the proximal and distal sections to provide a visual indication of the start of the soaker region of the catheter, in accordance with one embodiment of the present patent application.

Referring to FIG. 11, a catheter 300 preferably includes a hollow tube 302 having a proximal end 330 and a distal end 332. The catheter 300 preferably includes a visible marker tube 316 that is welded to an outer surface of the hollow tube 302, such as by using one or more steps of the methods shown and described above in FIGS. 2A-10B. The catheter 300 preferably includes a distal section 334 that extends between the visible marker tube 316 and the distal end 332 of the hollow tube 302. In one embodiment, the distal section 334, which may also be referred to as the soaker region of the catheter, preferably includes a plurality of spaced fluid openings 112 (FIG. 1A) that are located between the visible marker tube 316 and the distal end 332 of the hollow tube 302. Fluids may be drained from a patient or infused into a patient via the spaced fluid openings.

In one embodiment, the catheter 300 preferably includes a proximal section 336 that extends between the visible marker tube 316 and the proximal end 330 of the hollow tube 302. In one embodiment, the proximal section 336 of the catheter preferably has no spaced fluid openings, which is in contrast to the fluid openings located that are located within the distal section 334 of the hollow tube 302 of the catheter 300.

In one embodiment, a tissue anchor (not shown) may be secured to an end (e.g., the distal end) of the hollow tube 302.

Referring to FIG. 12, in one embodiment, the visible marker tube 316 is desirably welded and/or attached to the outer surface 306 of the hollow tube 302 of the catheter 300. The application of heat to the visible marker tube 316 desirably changes the composition of the material used to make the visible marker tube. In FIG. 12, a cross-section of the visible marker tube 316 depicts a thermal ring 340, which shows how the material within an interior region of the visible marker tube 316 is transformed by heat to promote securing the visible marker tube to the outer surface 306 of the outer wall 304 of the hollow tube 302 of the catheter 300.

Referring to FIGS. 13A and 13B, in one embodiment, an elongated catheter 400 preferably includes a visible marker tube 416 that is secured to an outer surface 406 of a hollow tube 402, such as by using the methods shown and described above in FIGS. 2A-10B. In addition, the catheter 400 preferably includes a visible marker filament 425 (e.g., a dyed polymer fiber) that is disposed within the elongated lumen 410 of the catheter 400. The distal end 432 of the hollow tube 402 is crimped for sealing the distal end of the hollow tube of the catheter. The crimped distal end preferably engages the distal end of the visible marker filament 425 for securing the visible marker filament to the distal end 432 of the hollow tube 202, thereby ensuring that the visible marker filament 425 is fixed in place within the elongated lumen 410 of the hollow tube 402 of the catheter 400. In one embodiment, the visible marker filament 425 may be centrally located within the elongated lumen 410.

In one embodiment, the visible marker filament 425 is a dyed polymer. In one embodiment, the visible marker tube 416 and the visible marker filament are dyed the same color (e.g., violet). In one embodiment, the visible marker filament 425 and the visible marker tube 416 comprise a dyed Monocryl polymer having about 0.04-0.05% D&C Violet 2, as defined in 21 CFR 74.1602.

FIG. 14 shows a perspective view of the catheter 400 shown and described above in FIGS. 13A and 13B. The catheter 400 preferably includes the hollow tube 402 having a proximal end 430 and a distal end 432 that is sealed. The catheter preferably includes the visible marker tube 416 that is welded to the outer surface 406 (FIG. 13B) of the hollow tube 402 for enabling medical personnel to distinguish between the distal section 434 and the proximal section 436 of the catheter, and for identifying the start of the distal section 434 (i.e., the soaker region) of the catheter 400.

The proximal section 436 of the catheter extends between the visible marker tube 416 and the proximal end 430 of the hollow tube 402. In one embodiment, the proximal section 432 of the catheter 400 does not have spaced openings extending through an outer wall of the hollow tube 402 so that the proximal section 432 may not be used to drain fluid from and/or infuse fluid into a patient.

In one embodiment, the distal section 434 of the catheter preferably includes a plurality of spaced openings 112 (FIG. 1A) that are formed in the outer wall of the hollow tube 402 and that extend between the visible marker tube 416 and the crimped distal end 432 of the hollow tube 402. In addition, the catheter 400 preferably includes the visible marker filament 425 (FIGS. 13A and 13B) that extends within the distal section 434 of the catheter. Thus, the embodiment shown in FIG. 14 has two visual indicators that enable medical personnel to locate the start of the distal section 434 (i.e., the soaker region) of the catheter, namely, the visible marker tube 416 and the visible marker filament 425.

Referring to FIGS. 15A and 15B, in one embodiment, a catheter 500 preferably includes a hollow tube 502 having an elongated lumen 510 that extends along the length thereof. The catheter 500 preferably includes a visible marker filament 525 that is disposed within the elongated lumen 510. In one embodiment, the distal end 532 of the hollow tube 502 is crimped for securing a distal end of the visible marker filament 525 to the distal end 532 of the hollow tube 502. Crimping the distal end 532 of the hollow tube 502 preferably fixes the distal end of the visible marker filament 525 to the hollow tube 502 and prevents the marker filament 525 from floating freely within the elongated lumen 510 of the catheter 500.

In one embodiment, the visible marker filament 525 is made of a polymer material, such as Monocryl or polydioxanone (PDS). In one embodiment, the visible marker filament 525 comprises a dyed Monocryl polymer having about 0.04-0.05% D&C Violet 2, as defined in 21 CFR 74.1602.

Figure 16:
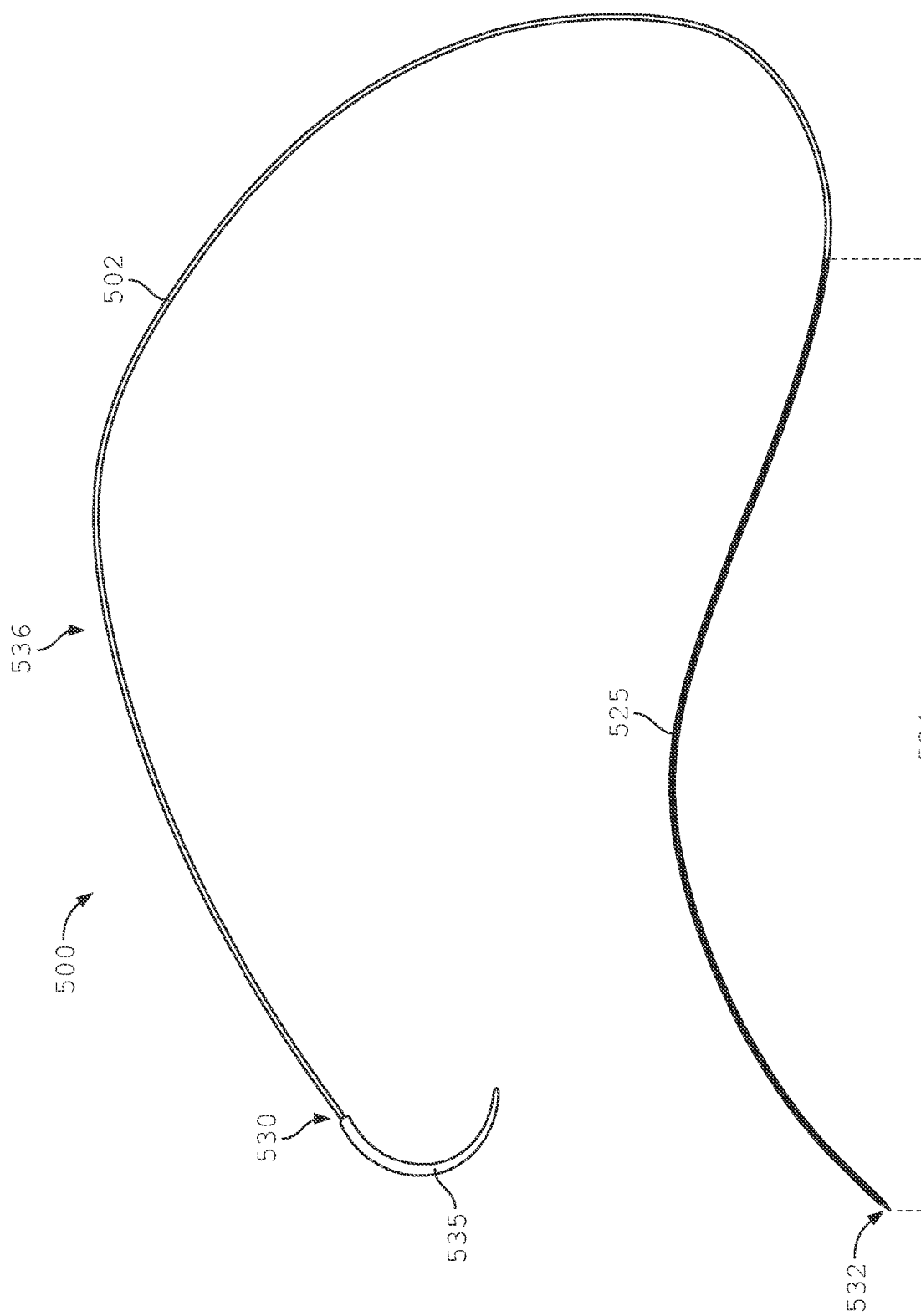
FIG. 16 is a perspective view of a catheter including a hollow tube having a proximal section, a distal section with a soaker region, and a visible marker filament disposed within an elongated lumen of the hollow tube of the catheter and secured to a distal end of a hollow tube of the catheter to provide a visual indication of the start of the soaker region of the catheter, in accordance with one embodiment of the present patent application.

Referring to FIG. 16, in one embodiment, the catheter 500 preferably includes a hollow tube 502 having a proximal end 530 and a distal end 532. In one embodiment, the visible marker filament 525 is disposed within the distal section 534 of the catheter 500 for enabling medical personnel to locate the start of the soaker region of the hollow tube 502. In addition, the visible marker filament 525 desirably provides a visual indicator of the length of the soaker region of the catheter 500, which, as noted above, is a section of the catheter that has spaced openings (FIG. 1A) for draining a fluid from and/or infusing a fluid into a patient.

In one embodiment, the distal end 532 of the hollow tube 502 may be crimped and/or sealed for securing the visible marker filament 525 within the elongated lumen of the hollow tube 502 so that the visible marker filament 525 is fixed to the distal end of the catheter 500.

In one embodiment, a needle 535 (e.g., a curved suture needle) may be secured to the proximal end 530 of the hollow tube 502 of the catheter 500. The needle 535 may be used for passing the catheter through a patient for implanting the catheter in a patient.

In one embodiment, a method of delivering a therapeutic fluid to tissue may include using the needle to form a first tissue opening at the first end of the wound and pulling the hollow tube completely through the first tissue opening until a tissue anchor abuts against tissue at the first end of the wound.

In one embodiment, a method of delivering a therapeutic fluid to tissue desirably includes passing the needle through a skin layer of a patient so that the needle and the proximal end of the hollow tube are located outside the patient.

In one embodiment, a method of delivering a therapeutic fluid to tissue may include cutting the proximal end of the hollow tube for detaching the needle from the hollow tube, and introducing a therapeutic fluid into the cut proximal end of the hollow tube so that the therapeutic fluid flows into the elongated lumen and passes through the fluid openings located within the soaker region of the catheter for infusing tissue (e.g., a wound) with the therapeutic fluid.

Infections associated with orthopedic implants can be disastrous for a patient, often resulting in severe consequences including reoperation, amputation, or death. Delivery of therapeutic fluids, such as local antibiotics, directly to the infected site at elevated doses, which would be hazardous if delivered systemically, but safe when delivered locally, can be accomplished using the catheters disclosed herein.

Inoperable tumors often leave patients with limited choices. Delivery of high dose chemotherapeutic agents or immune therapies (e.g., modified T-cells) directly to the tumor may provide a benefit not available before. The bioabsorbable catheters disclosed herein may be used to provide this type of local delivery of therapeutic fluids.

Post-op pain management with opioids is often not ideal for several reasons including risk of addiction, severe constipation, and cognitive impairment. The delivery of local anesthetics directly to the wound site with the catheters disclosed herein preferably provides a mechanism for reducing opioid use while minimizing patient pain and suffering.

In one embodiment, a catheter disclosed herein may be coated and/or impregnated with an antimicrobial agent for preventing bacterial colonization. In one embodiment, a preferred antimicrobial agent is triclosan. In one embodiment, a vapor process may be used for applying a triclosan antimicrobial agent to a catheter, such as a polymer catheter made of polydioxanone or polycaprolactone. In one embodiment, antimicrobial agents used for catheters may include, but are not limited to, triclosan, chlorohexadiene, povidone iodine, and/or silver compounds.

Figure 17A:
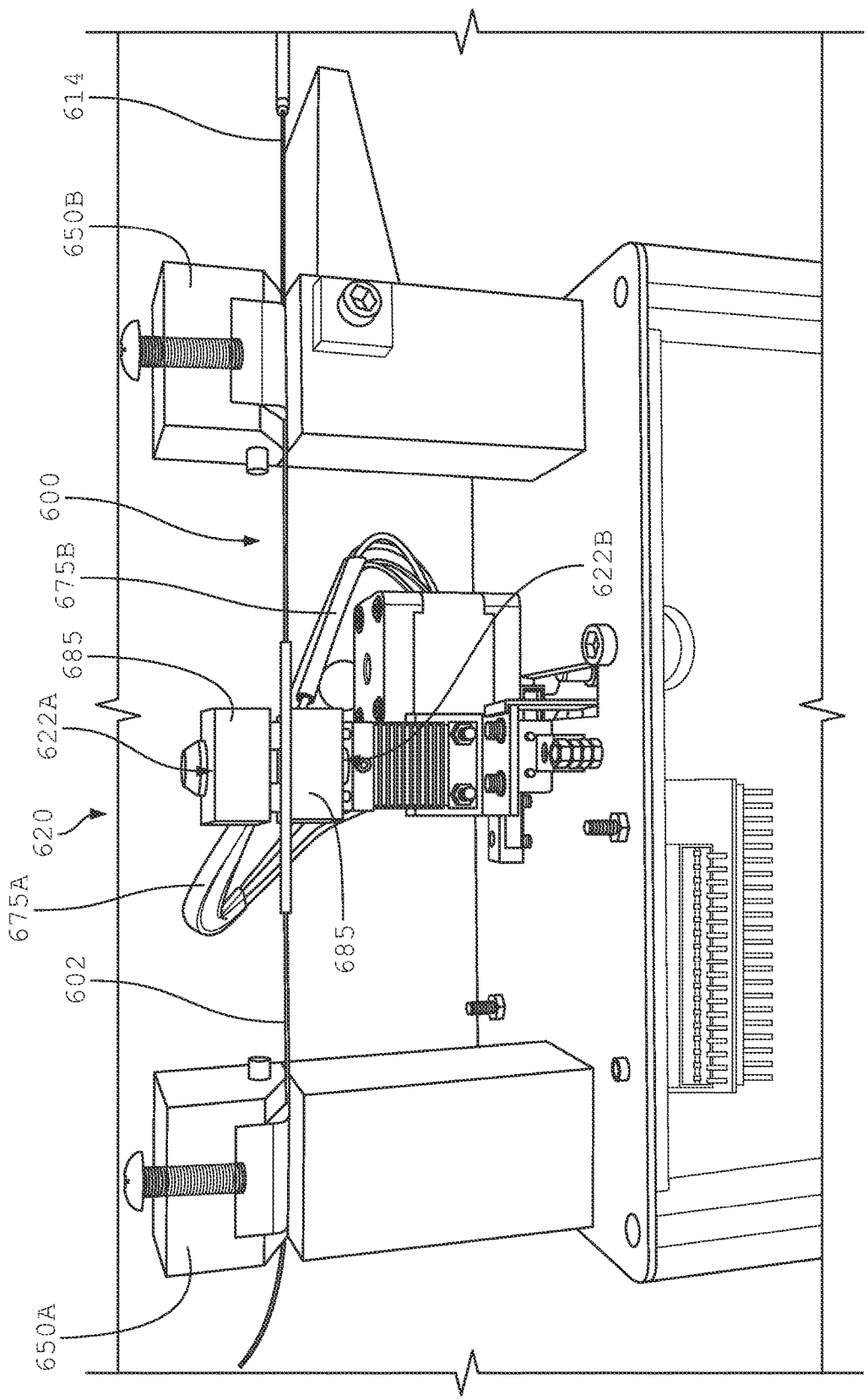
FIG. 17A shows a heating system during a first stage of a method of fusing a visible marker tube to an outer surface of a hollow tube of a catheter to provide a visual indicator of the start of a soaker region on the catheter, in accordance with one embodiment of the present patent application.

Referring to FIG. 17A, in one embodiment, a heating assembly 620 may be utilized for generating and applying heat for securing a visible marker tube to an outer surface of a hollow tube 602 of a catheter 600. As noted above, the visible marker tube may be utilized for designating the beginning of a distal section (i.e., a soaker region) of a catheter. In one embodiment, a mandrel 614 is passed through an elongated lumen of the hollow tube 602 of the catheter 600. In one embodiment, a first clamp 650A is utilized for fixing a first end of the catheter 600 and a second clamp 650B may be utilized for fixing a second section of the catheter 600. The first and second clamps 650A, 650B may hold the hollow tube 602 under tension.

In one embodiment, the heating assembly 620 preferably includes first and second heater blocks 622A, 622B that are adapted to heat a region of the assembly that includes the visible marker tube 216 and the sacrificial tube 218 (FIG. 7A) that are assembled over the outer surface of the hollow tube 602.

Each of the heater blocks 622A, 622B preferably includes a heating element that is embedded in an aluminum heating block. One of the heating elements is located in the first heater block 622A and one of the heating elements is located in the second heater block 622B. The respective heating elements embedded in the aluminum heating blocks are electrically connected to a control system via the conductive wires 675A, 675B (shown in red). The heater assembly 620 preferably includes a temperature feedback loop using 100 k thermistors embedded in each of the two aluminum heating blocks.

Each heater block 622A, 622B preferably includes an insulating silicone case 685 that is in place for safety (e.g., to prevent burns) and for heat retention. The insulating silicone cases are only on the exterior of the heater blocks and not within a gap that is located between the opposing faces of the heater blocks. The catheter is preferably positioned within the gap for securing the visible marker tube to the outer surface of the hollow tube of the catheter.

In one embodiment, the heater blocks 622A, 622B are sold as part number Ender 3-Extruder under the brand name RICHOOSE at Amazon.com: 3D Printer Parts Ender 3 Hotend Assembled Ender 3 Pro Extruder Kit 24V 40 W for Creality Ender 3/Ender 3 Pro with Silicon Cover and 0.4 mm Nozzles: Industrial & Scientific.

Figure 17B:
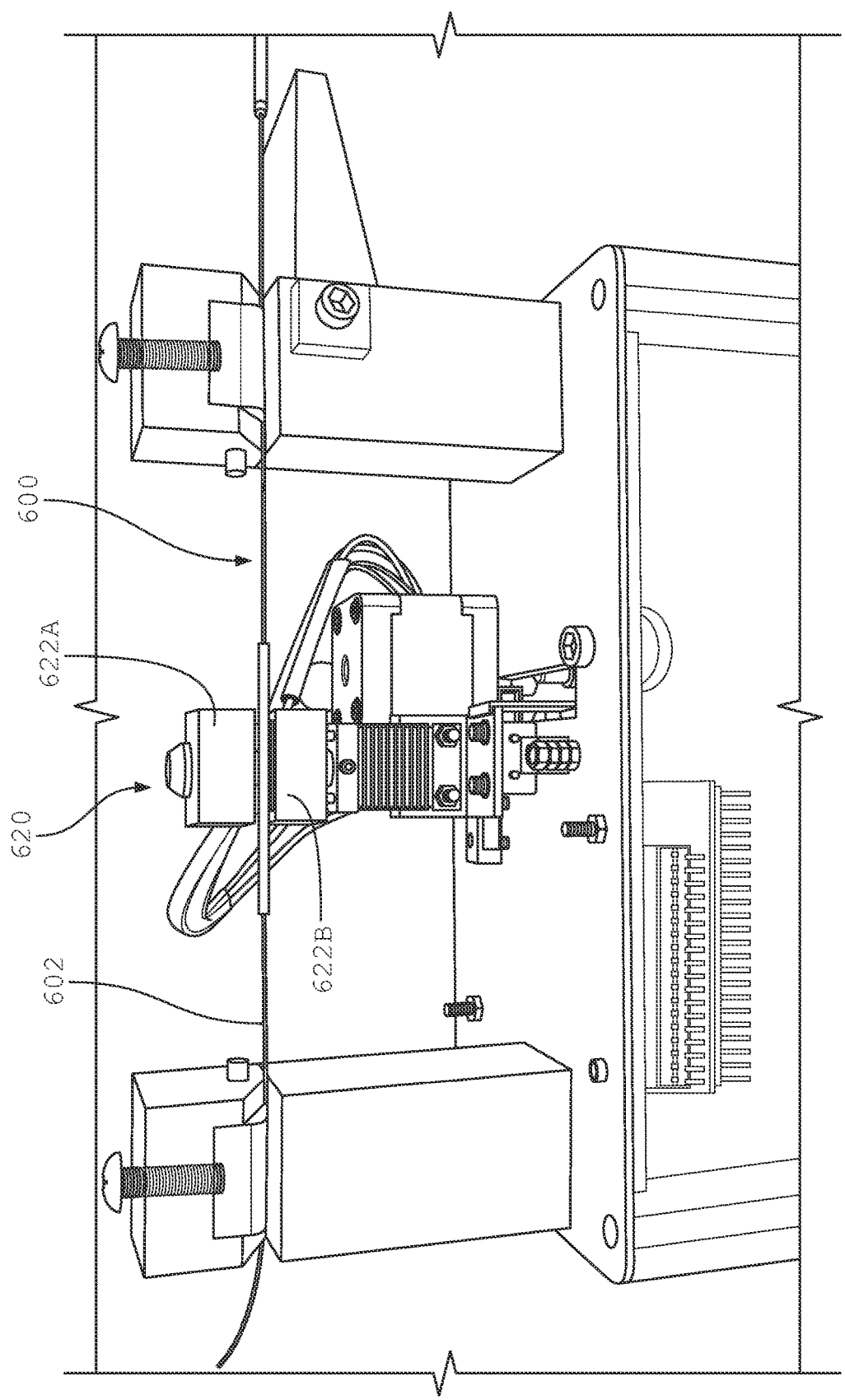
FIG. 17B shows a heating system during a second stage of a method of fusing a visible marker tube to an outer surface of an elongated body of a catheter to provide a visual indicator of the start of a soaker region on the catheter, in accordance with one embodiment of the present patent application.
Figure 17C:
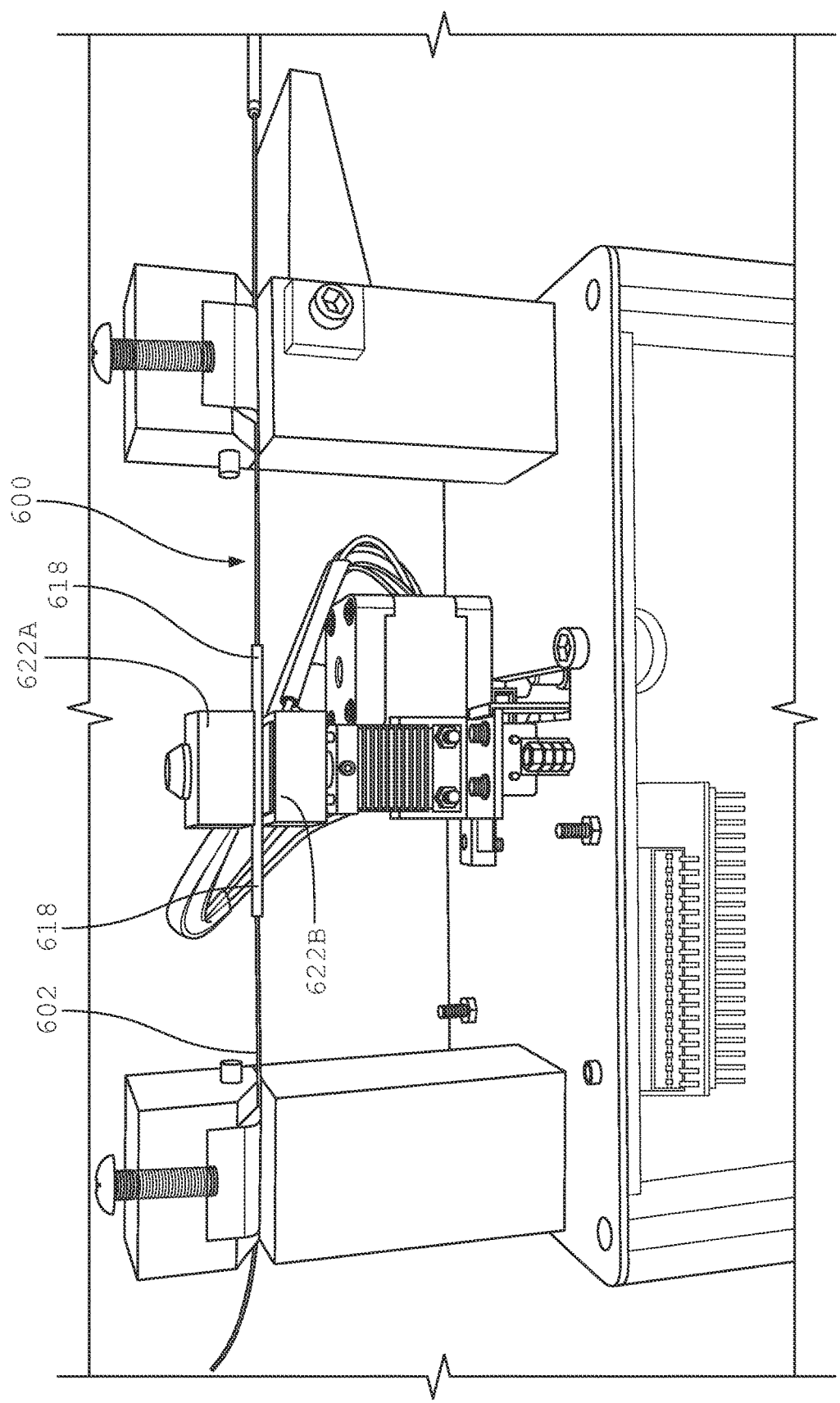
FIG. 17C shows a heating system during a third stage of a method of fusing a visible marker tube to an outer surface of an elongated body of a catheter to provide a visual indicator of the start of a soaker region on the catheter, in accordance with one embodiment of the present patent application.

Referring to FIGS. 17B and 17C, in one embodiment, the heater assembly 620 preferably includes a step motor 652 that moves the first and second heater blocks 622A, 622B into alignment with the sacrificial tube and the visible marker tube, which, in turn, are positioned at a location that designates the start of the distal section and/or soaker region of the catheter.

Referring to FIG. 17C, in one embodiment, the first and second heater blocks 622A, 622B generate heat that is directed at the sacrificial tube and the visible marker tube for shrinking the sacrificial tube so that it compresses the visible marker tube into the outer surface of the hollow tube 602 of the catheter 600. In one embodiment, the first and second heater blocks 622A, 622B are configured to apply heat to the assembly within a range of about 190-220 degrees Celsius for about 6-14 seconds. In a more preferred embodiment, the first and second heater blocks 622A, 622B are configured to apply heat to the assembly at a temperature of about 205 degrees Celsius for about 10 seconds. In one embodiment, the heat preferably passes through the sacrificial tube and an outer region of the visible marker tube for at least partially melting the visible marker tube for securing the visible marker tube to the outer surface of the hollow tube of the catheter.

In one embodiment, the first visible marker (e.g., a visible marker collar) may be made of Monocryl and the heat is applied within a temperature range of 190-220 degrees Celsius for about 4-16 seconds, and more preferably at 205 degrees Celsius for about 10 seconds.

In one embodiment, the first visible marker (e.g., a visible marker collar) may be made of a polymer material (e.g., PDS) and the heat is applied within a temperature range of about +/−15 degrees Celsius from the Melt Point (or melting peak temperature) of the polymer material of the first visible marker for about 4-16 seconds, and more preferably within a temperature range of about +/−1.0 degrees Celsius from the Melt Point (or melting peak temperature) of the polymer material of the first visible marker for about 10 seconds.

Figure 17D:
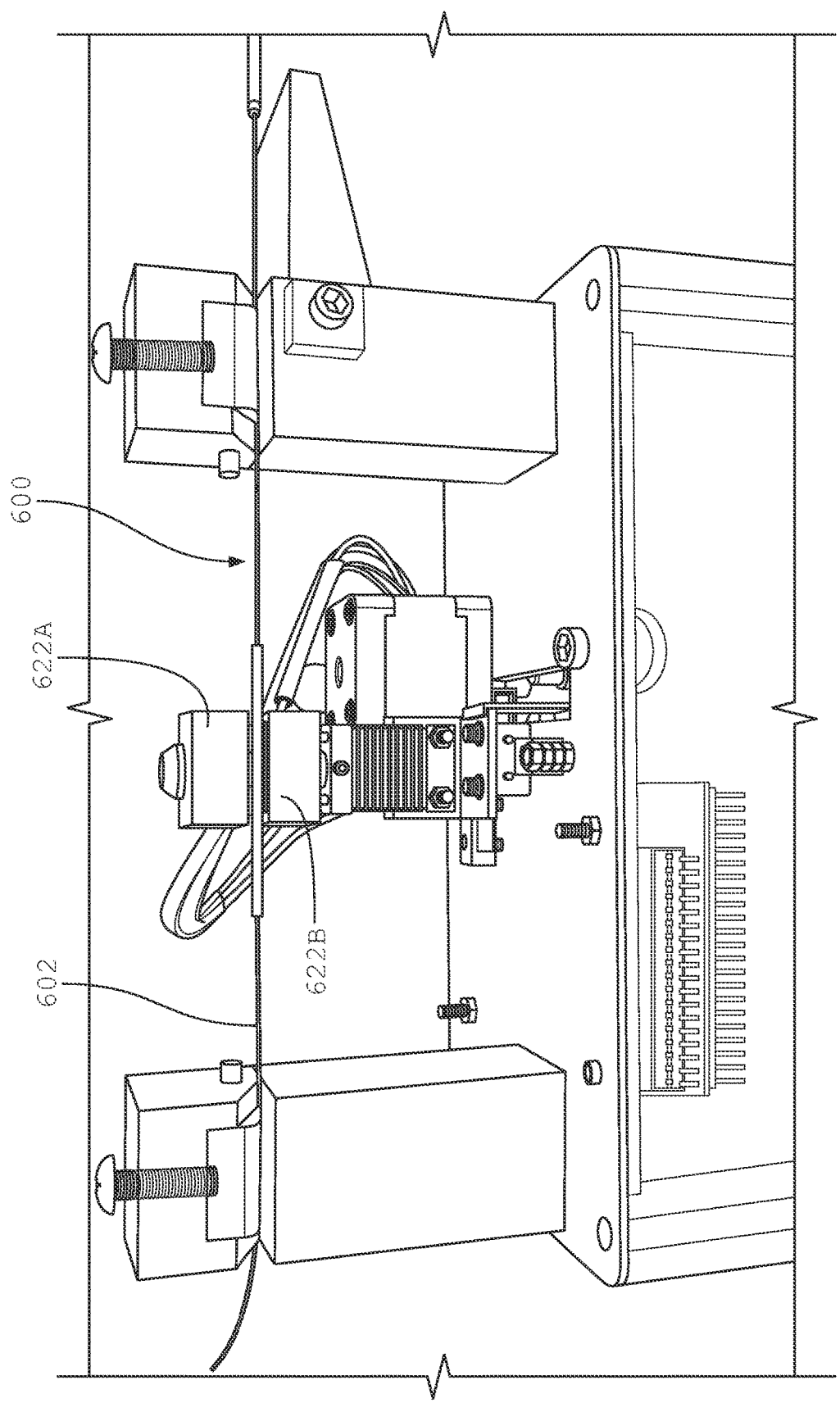
FIG. 17D shows a heating system during a fourth stage of a method of fusing a visible marker tube to an outer surface of an elongated body of a catheter to provide a visual indicator of the start of a soaker region on the catheter, in accordance with one embodiment of the present patent application.

Referring to FIGS. 17D and 17E, after an appropriate level of heat has been applied to the sacrificial tube and the visible marker tube for securing the visible marker tube to the outer surface of the hollow tube 602 of the catheter 600, the step motor 652 preferably retracts the first and second heater block 622A, 622B so that the catheter 600 with the visible marker tube secured to the hollow tube 602 of the catheter may be removed from its fixed position between the first and second clamps 650A, 650B. The first and second clamps 650A, 650B may be loosened and/or opened for removing the catheter assembly from the clamps of the heater system. In one embodiment, before or after the catheter 600 is removed from the clamps 650A, 650B, the mandrel 614 may be removed from the elongated lumen of the hollow body 602 of the catheter 600.

Figure 18:
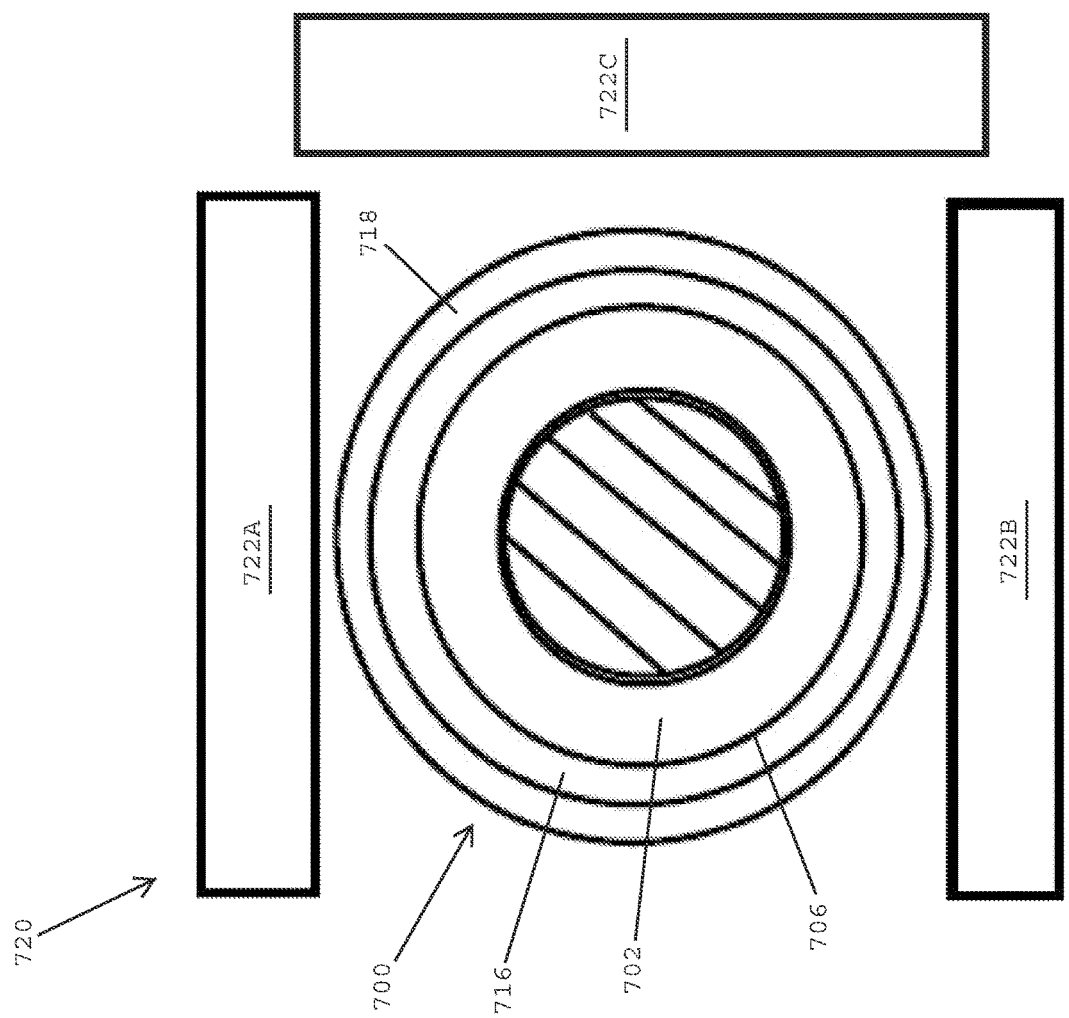
FIG. 18 is a cross-sectional view of a heating system used for fusing a visible marker tube to an outer surface of an elongated body of a catheter to provide a visual indicator of the start of a soaker region on the catheter, in accordance with one embodiment of the present patent application.

Referring to FIG. 18, in one embodiment, a heating system 720 for fusing a visible marker tube 716 to an outer surface 706 of an elongated body 702 of a catheter 700 may include a first heater block 722A that overlies a topside of the catheter 700, a second heater block 722B that underlies a bottom of the catheter 700 and a third heater block 722C that directs heat at a lateral side of the catheter 700. The three heater blocks 722A-722C preferably direct heat at a sacrificial tube 718 made of heat shrink material (e.g., PTFE) that is positioned over the visible marker tube 716. As heat is applied to the sacrificial tube 718, the sacrificial tube compresses inwardly onto the visible marker tube 716. In addition, the heat passes into the material of the visible marker tube for at least partially melting the material of the visible marker so as to secure the visible marker tube 716 to the outer surface 706 of the hollow tube 702 of the catheter 700.

Referring to FIGS. 20A and 20B, in one embodiment, a catheter 800 may be used for draining and/or infusing fluid. The catheter 800 desirably includes a hollow tube 802 having an outer wall 804 with an outer surface 806 and an inner surface 808 that surrounds an elongated lumen 810 that extends along the length of the catheter 800. In one embodiment, the catheter 800 preferably includes a plurality of spaced, elongated slits 812 that are formed in the outer wall 804 of the hollow tube 800. In one embodiment, the elongated slits 812 having greater respective lengths than widths. The spaced, elongated slits 812 preferably extend completely through the outer wall 804 from the outer surface 806 to the inner surface 808 so that fluid flowing through the central lumen 810 may pass through the spaced, elongated slits 812 for being infused into a patient. In one embodiment, the elongated slits 812 may be used to drain fluid from a patient and the drained fluid may be removed via the lumen 810.

The catheter 800 shown in FIG. 20A depicts only a section of a catheter that lies within a soaker region. The entire length of the catheter 800 is not shown. In one embodiment, the elongated slits 812 are located in a distal section of the catheter, as shown by the distal section 334 in FIG. 11.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A catheter for delivering fluids comprising:
   a hollow tube having a proximal section, a distal section, and an elongated lumen that extends through the hollow tube from the proximal section to the distal section;
   one or more fluid openings extending through a wall of the distal section are in fluid communication with the elongated lumen of the hollow tube;
   a first visible marker disposed on an outer surface of the hollow tube at a junction of the proximal and distal sections of the hollow tube; and
   a second visible marker disposed within the elongated lumen of the hollow tube and extending between the junction of the proximal and distal sections of the hollow tube and a distal end of the hollow tube.

2. The catheter as claimed in claim 1, wherein said hollow tube and said first visible marker comprise the same polymeric material.

3. The catheter as claimed in claim 1, wherein said first visible marker comprises a dye or a pigment that defines a first color.

4. The catheter as claimed in claim 3, wherein said hollow tube is made of a translucent or transparent material.

5. The catheter as claimed in claim 3, wherein said hollow tube has a second color that contrasts with the first color of said first visible marker.

6. The catheter as claimed in claim 1, wherein said first visible marker comprises a tube-shaped collar that extends around the outer surface of said hollow tube.

7. The catheter as claimed in claim 6, wherein said hollow tube has an outer diameter, and wherein said tube-shaped collar has a central opening that defines an inner diameter that is equal to or slightly larger than the outer diameter of said hollow tube.

8. The catheter as claimed in claim 1, wherein the distal end of the hollow tube is sealed, and wherein a distal end of the second visible marker is secured to the sealed distal end of the hollow tube.

9. The catheter as claimed in claim 1, wherein the hollow tube, the first visible marker and the second visible marker comprise polymeric material.

10. The catheter as claimed in claim 1, wherein the first and second visible markers are the same color.

11. The catheter as claimed in claim 1, wherein said hollow tube comprises a polymer material having a draw ratio of greater than four (4).

12. The catheter as claimed in claim 11, wherein the hollow tube has a longitudinal axis and the polymer material has a molecular orientation in a direction of the longitudinal axis.

13. The catheter as claimed in claim 1, wherein the second visible marker is disposed within the elongated lumen of the hollow tube such that the second visible marker is separate from the hollow tube and does not contact a wall of the hollow tube and wherein the second visible marker extends from a starting point adjacent the junction of the proximal and distal sections of said hollow tube to an ending point adjacent the distal end of the hollow tube.

14. A catheter for delivering fluids comprising:
   a hollow tube having a proximal section, a distal section, and an elongated lumen that extends through the hollow tube from the proximal section to the distal section;

one or more fluid openings formed in the distal section of the hollow tube and are in fluid communication with the elongated lumen;

a visible marker collar disposed on an outer surface of the hollow tube, wherein the visible marker collar is located at a junction of the proximal and distal sections of the hollow tube; and a visible marker filament disposed within the elongated lumen of the hollow tube and extending between the junction and a distal end of the hollow tube.

15. The catheter as claimed in claim 14, wherein the distal end of said hollow tube is sealed, and wherein a distal end of said visible marker filament is secured to the sealed distal end of said hollow tube.

16. The catheter as claimed in claim 14, wherein said hollow tube, said visible marker collar and said visible marker filament comprise polymeric material.

17. The catheter as claimed in claim 14, wherein said hollow tube comprises a polymer material having a draw ratio of greater than four (4).

18. A catheter for delivering fluids comprising:
a hollow tube having a proximal section, a distal section, and an elongated lumen that extends through the hollow tube from the proximal section to the distal section;

one or more fluid openings formed in the distal section of the hollow tube and are in fluid communication with the elongated lumen of the hollow tube; and a visible marker filament disposed within the elongated lumen of the hollow tube and extending between a junction of the proximal and distal sections of the hollow tube and a distal end of the hollow tube.

19. The catheter as claimed in claim 18, further comprising a visible marker collar secured to an outer surface of said hollow tube, wherein said visible marker collar is located at the junction of said proximal and distal sections of said hollow tube.

20. The catheter as claimed in claim 19, wherein said visible marker filament and said visible marker collar are the same color, and wherein said hollow tube comprises a polymer material having a draw ratio of greater than four (4).

* * * * *